US006859972B2

(12) United States Patent
Couch

(10) Patent No.: US 6,859,972 B2
(45) Date of Patent: Mar. 1, 2005

(54) WIPER SYSTEM INCLUDING SEPARATOR ASSEMBLY

(76) Inventor: John H. Couch, 3292 Emmons Ave., Rochester Hills, MI (US) 48307

( * ) Notice: Subject to any disclaimer, the term of this patent is extended or adjusted under 35 U.S.C. 154(b) by 23 days.

(21) Appl. No.: 10/352,363

(22) Filed: Jan. 27, 2003

(65) Prior Publication Data

US 2004/0045114 A1 Mar. 11, 2004

Related U.S. Application Data

(60) Provisional application No. 60/409,876, filed on Sep. 11, 2002.

(51) Int. Cl.[7] ................................................. B60S 1/32
(52) U.S. Cl. ................................. 15/250.19; 15/250.001
(58) Field of Search ........................ 15/250.19, 250.351, 15/250.001, 250.202, 251.21, 250.352

(56) References Cited

U.S. PATENT DOCUMENTS

| 2,784,438 | A | * | 3/1957 | Petersen | ................... | 15/250.19 |
| 2,795,004 | A | * | 6/1957 | Bowen | ..................... | 15/250.19 |
| 5,274,875 | A | * | 1/1994 | Chou | ...................... | 15/250.19 |
| 5,487,204 | A | * | 1/1996 | Nelson | .................... | 15/250.19 |
| 5,867,858 | A |   | 2/1999 | Kelly | ..................... | 15/250.19 |
| 6,286,175 | B1 | * | 9/2001 | Lee | .......................... | 15/250.19 |
| 6,471,784 | B2 | * | 10/2002 | Lahti | ............................ | 134/42 |
| 6,622,338 | B1 | * | 9/2003 | Chen et al. | .............. | 15/250.19 |

FOREIGN PATENT DOCUMENTS

| DE | 3731921 | * | 12/1988 | ............. | 15/250.19 |
| JP | 0185658 | * | 9/1985 | ............. | 15/250.19 |
| JP | 4-85150 | * | 3/1992 | | |
| JP | 5-162616 | * | 6/1993 | | |

* cited by examiner

Primary Examiner—Gary K. Graham
(74) Attorney, Agent, or Firm—Harness, Dickey & Pierce, P.L.C.

(57) ABSTRACT

A wiper system for use with a windshield is provided and includes a wiper arm having a first and second end. The first end of the wiper arm includes a reaction surface disposed thereon while the second end includes a wiper blade biased into engagement with the windshield. In addition, a drive motor is fixedly attached to the first end of the wiper arm, whereby the drive motor includes a drive shaft operable to pivot the wiper arm across the windshield. A separator assembly is further provided and is supported by the drive shaft. The separator assembly is disposed within the arm and is operable to react against the reaction surface of the arm to selectively lift the wiper arm from engagement with the windshield.

12 Claims, 21 Drawing Sheets

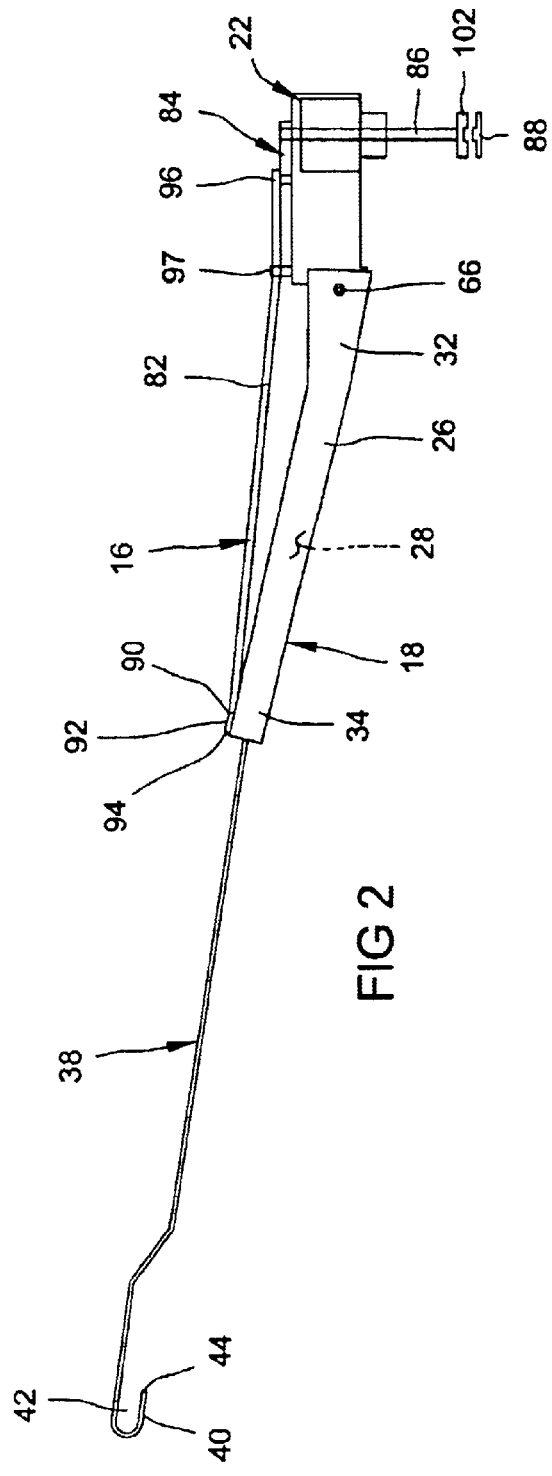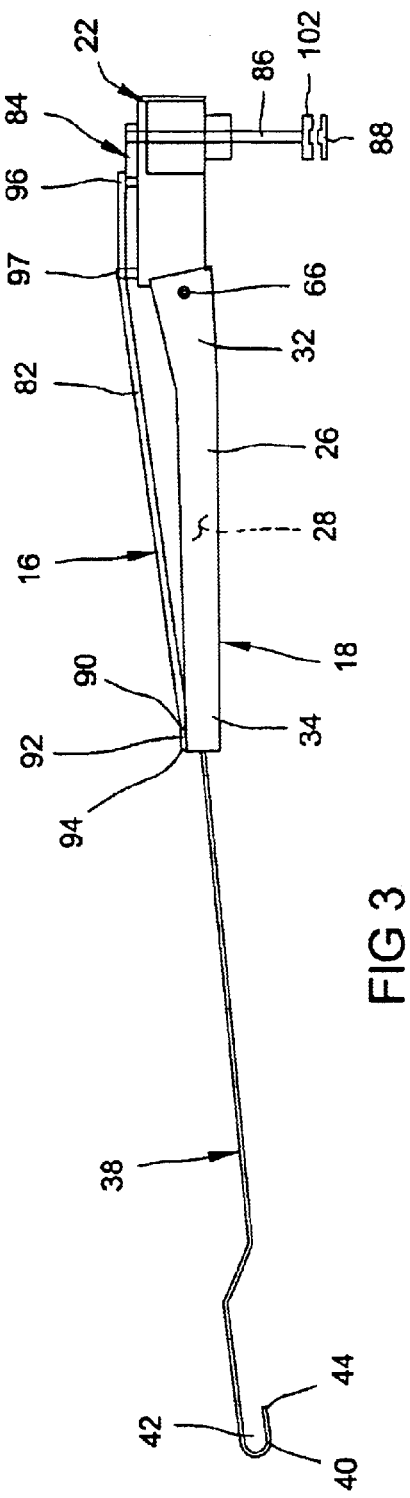

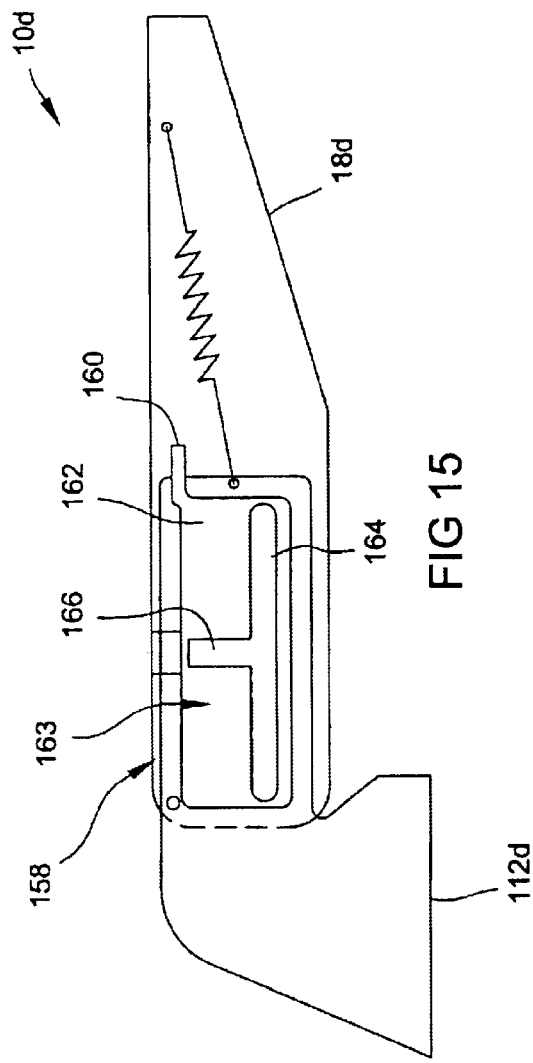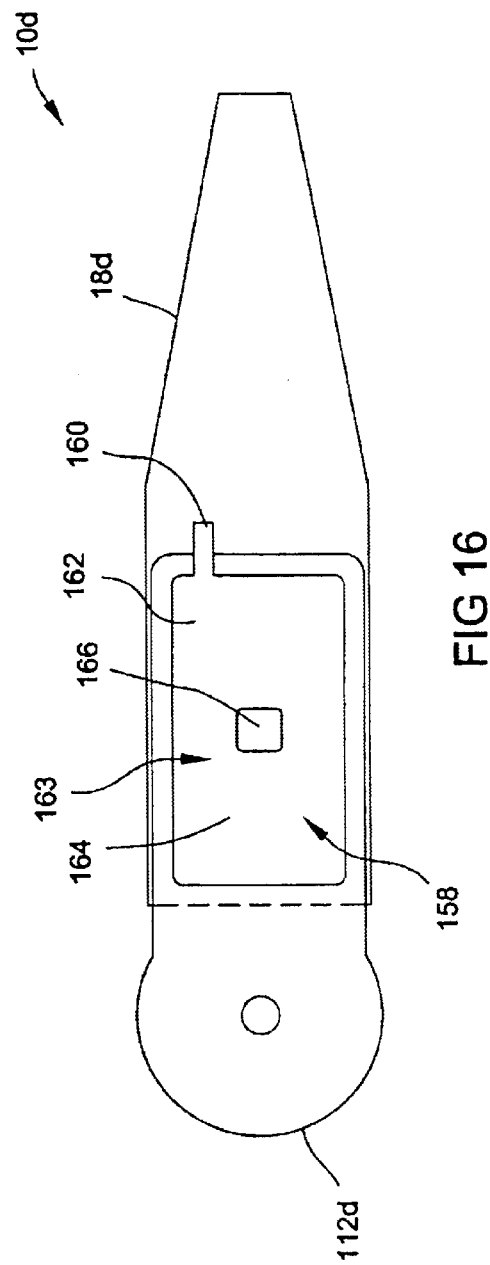

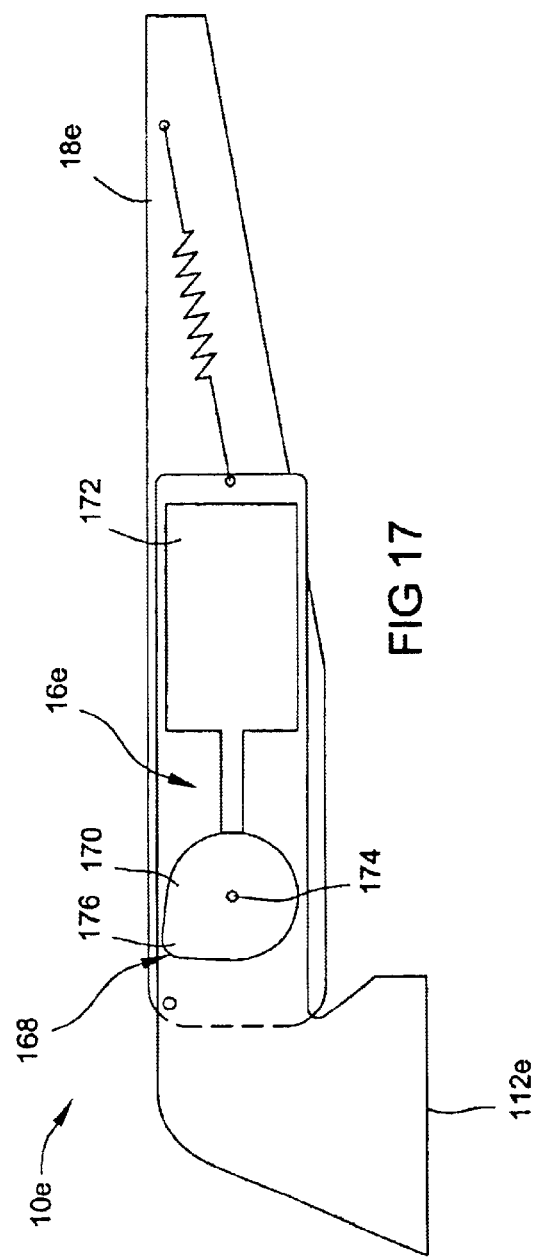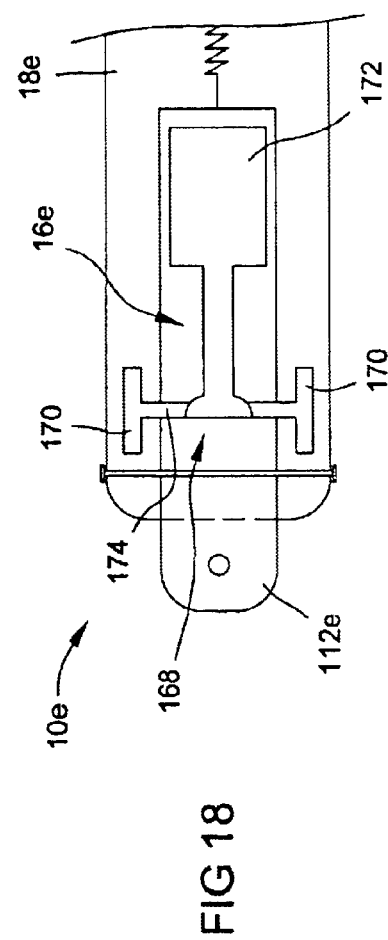

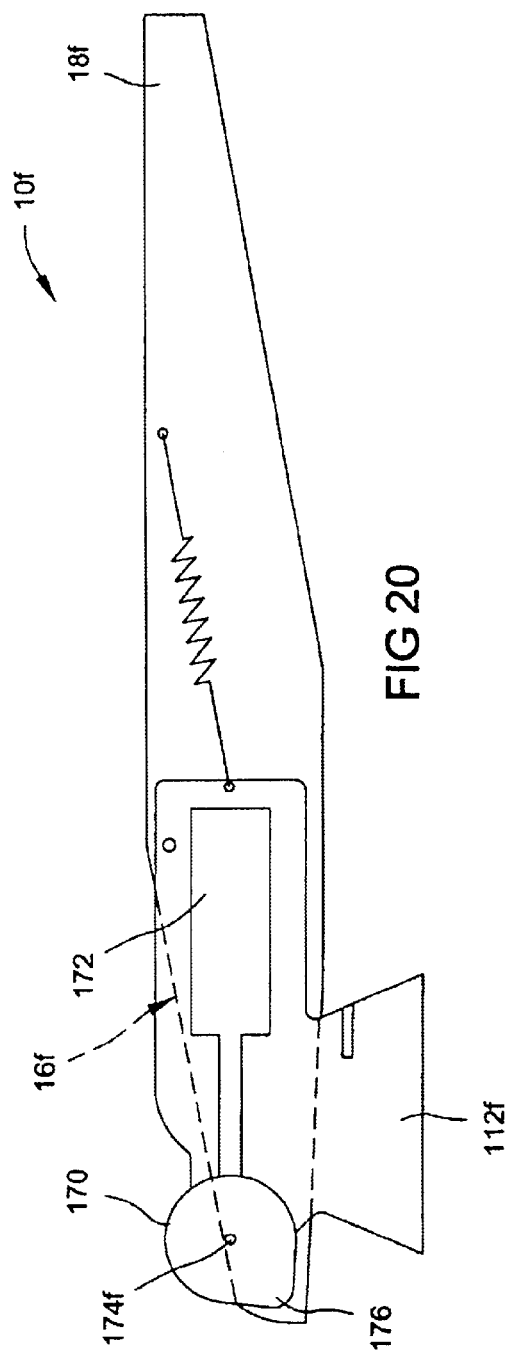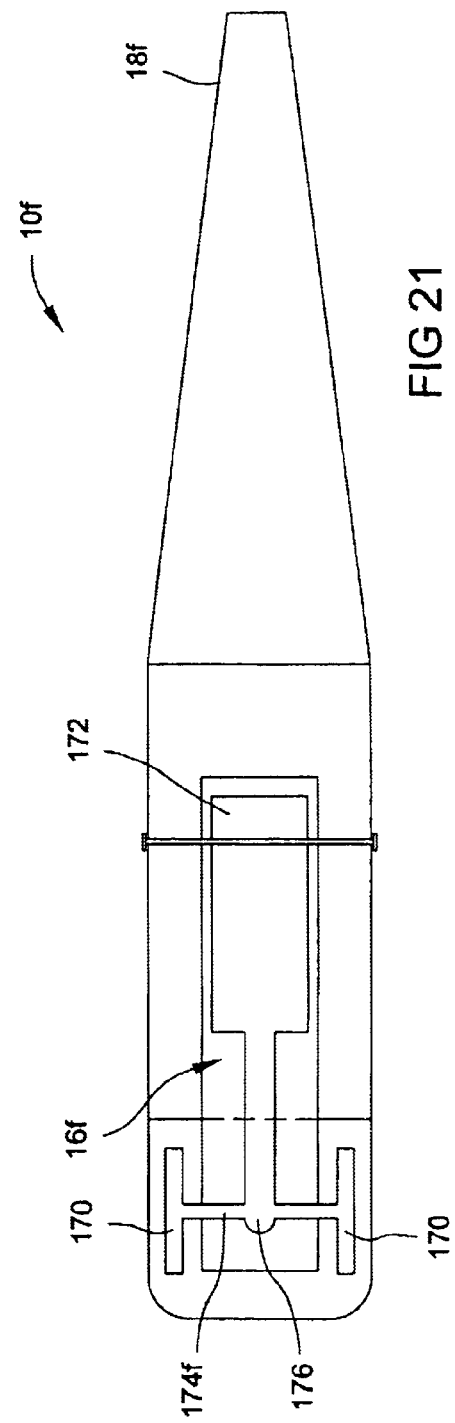

WIPER SYSTEM INCLUDING SEPARATOR ASSEMBLY

CROSS-REFERENCE TO RELATED APPLICATIONS

This application claims the benefit of U.S. Provisional Application No. 60/409,876, filed on Sep. 11, 2002.

FIELD OF THE INVENTION

The present invention relates to wiper assemblies and more particularly to a wiper assembly capable of removing debris trapped under a wiper assembly.

BACKGROUND OF THE INVENTION

In using a windshield in either an automotive application or in other applications such as in boating, heavy machinery or the like, it is imperative that the operator be able to clearly see through the windshield to steer and maneuver the machine. Further, it is desirable that the operator be able to clearly see through the windshield in inclimate weather conditions such as in rain, sleet, or snow. Further yet, it is desirable that the operator be able to remotely clean the windshield of foreign substances such as dirt, leaves, and other mire to maintain visibility. To that end, a windshield wiper system cooperating with an outer surface of a windshield plays a significant role.

Maintaining a clean windshield is crucial in the safe and responsible operation of a vehicle to ensure that the operator is able to clearly see and steer the vehicle through various weather and driving conditions. In this regard, a windshield wiper system is conventionally used to articulate back and forth across the windshield of a vehicle in an effort to wipe away moisture or debris, thereby providing the operator and other occupants with a clear sight path through the windshield.

Conventional wiper systems typically include a pair of arms rotatably driven by a wiper motor, whereby each arm includes a wiper blade in uniform contact with an outer surface of the windshield extending over a predetermined surface of the windshield. The wiper blade is conventionally fabricated from an elastomeric material, thereby allowing the blade to conform to the generally complex and curved shape of the windshield. The effectiveness of the wiper system is directly related to the ability of the wiper blade to maintain a uniform contact with the windshield throughout the region of the predetermined surface such that water can be effectively trapped between the blade and the windshield and ultimately removed through articulation of the arms.

The wiper motor serves to articulate the arms across the predetermined surface in an effort to clean the windshield and improve visibility. The sweeping motion of the wiper arms catches debris collected on an outer surface of the windshield and serves to move the debris to an outer edge thereof. In doing so, the wiper arms effectively move debris out of the line of vision of the operator and other occupants, thereby improving visibility. In this manner, larger objects such as leaves or pine cones are caught by the arm and are moved to the side of the windshield through the back and forth movement of each arm. For water and other smaller objects such as pine needles or bugs, the wiper blade contacts the object and serves to move or push the debris to the sides of the windshield. In either situation, the debris is often removed by the forward movement of the vehicle in cooperation with the movement of the arms such that the wind rushing over the windshield removes the debris all together.

The operation of the wiper system is hindered when debris is collected under the wiper blade, thereby preventing a uniform engagement between the wiper blade and the windshield. In this manner, the wiper system cannot function properly when debris is trapped between the wiper blade and the windshield as water cannot effectively be trapped between the wiper blade and the windshield when the blade is locally removed from contact with the windshield by debris. By hindering the operation of the wiper assembly, debris trapped between the wiper blade and the windshield makes operation of the vehicle difficult as visibility through the windshield is reduced.

In addition to debris, collection of frozen water between the blade and the windshield in the form of ice or slush similarly causes the blade to locally disengage the windshield, thereby hindering operation of the wiper system. In addition to locally lifting the wiper blade from contact with the windshield, the temperature of the ice or slush often hardens the wiper blade, thereby not allowing the blade to conform to the shape of the windshield. Further, the hardening of the ice or slush may even freeze the blade in one position such that the motor cannot rotate the arms. In any event, the operator is often required to remove the debris from under the blade by lifting the blade from contact with the windshield and manually removing the debris. In the case of frozen water or slush, the operator is often required to quickly lift the blade from contact with the windshield and allow the blade to snap back, thereby dislodging any ice or snow from the blade.

Conventional wiper systems have been modified to incorporate debris removing systems, operating on the principal that by lifting the wiper arm and removing the wiper blade from contact with the windshield, the debris collected between the wiper blade and the windshield will be released, thereby allowing the debris to be removed by a rush of air caused by the forward movement of the vehicle. Such systems, while adequately lifting the wiper blade from contact with the windshield, typically require interaction with an apparatus mounted on an external surface of the vehicle such as a ramp or a lift. In this manner, the lift or the ramp is visible on the exterior of the vehicle whether the wiper system is in use or not, thereby reducing the overall aesthetics of the vehicle and increasing drag over the windshield.

Therefore, a wiper system that is capable of being remotely actuated between a normal use position to clean a windshield and a lift position to remove debris from underneath the wiper blade is desirable in the industry. Furthermore, a wiper system that provides a lift mechanism housed entirely within the body or arm of the wiper system is desirable in the industry.

SUMMARY OF THE INVENTION

Accordingly, the present invention provides a wiper system for use with a windshield including a wiper arm having a first and second end. The first end of the wiper arm includes a reaction surface disposed thereon while the second end includes a wiper blade biased into engagement with the windshield. In addition, a drive motor is fixedly attached to the first end of the wiper arm, whereby the drive motor includes a drive shaft operable to pivot the wiper arm across the windshield. A separator assembly is further provided and is supported by the drive shaft. The separator assembly is disposed within the arm and is operable to react against the reaction surface of the arm to selectively lift the wiper arm from engagement with the windshield.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

The present invention will become more fully understood from the detailed description and the accompanying drawings, wherein:

FIG. 2 is a perspective view of a first embodiment of a wiper assembly with part of a housing removed to show the internal components of the wiper assembly in a disengaged position;

FIG. 3 is a perspective view of a first embodiment of a wiper assembly with part of a housing removed to show the internal components of the wiper assembly in an engaged position;

FIG. 15 is a side view of a sixth embodiment of a wiper assembly with part of a housing removed to show the internal components of the wiper assembly in a disengaged position;

FIG. 16 is a top view of the wiper assembly of FIG. 15;

FIG. 17 is a seventh embodiment of a wiper assembly with part of a housing removed to show the internal components of the wiper assembly in a disengaged position;

FIG. 18 is a top view of the wiper assembly of FIG. 17;

FIG. 20 is a eighth embodiment of a wiper assembly with part of a housing removed to show the internal components of the wiper assembly in a disengaged position;

FIG. 21 is a top view of the wiper assembly of FIG. 20;

DETAILED DESCRIPTION OF THE PREFERRED EMBODIMENTS

The following description of the preferred embodiment(s) is merely exemplary in nature and is in no way intended to limit the invention, its application, or uses.

Figure 1:
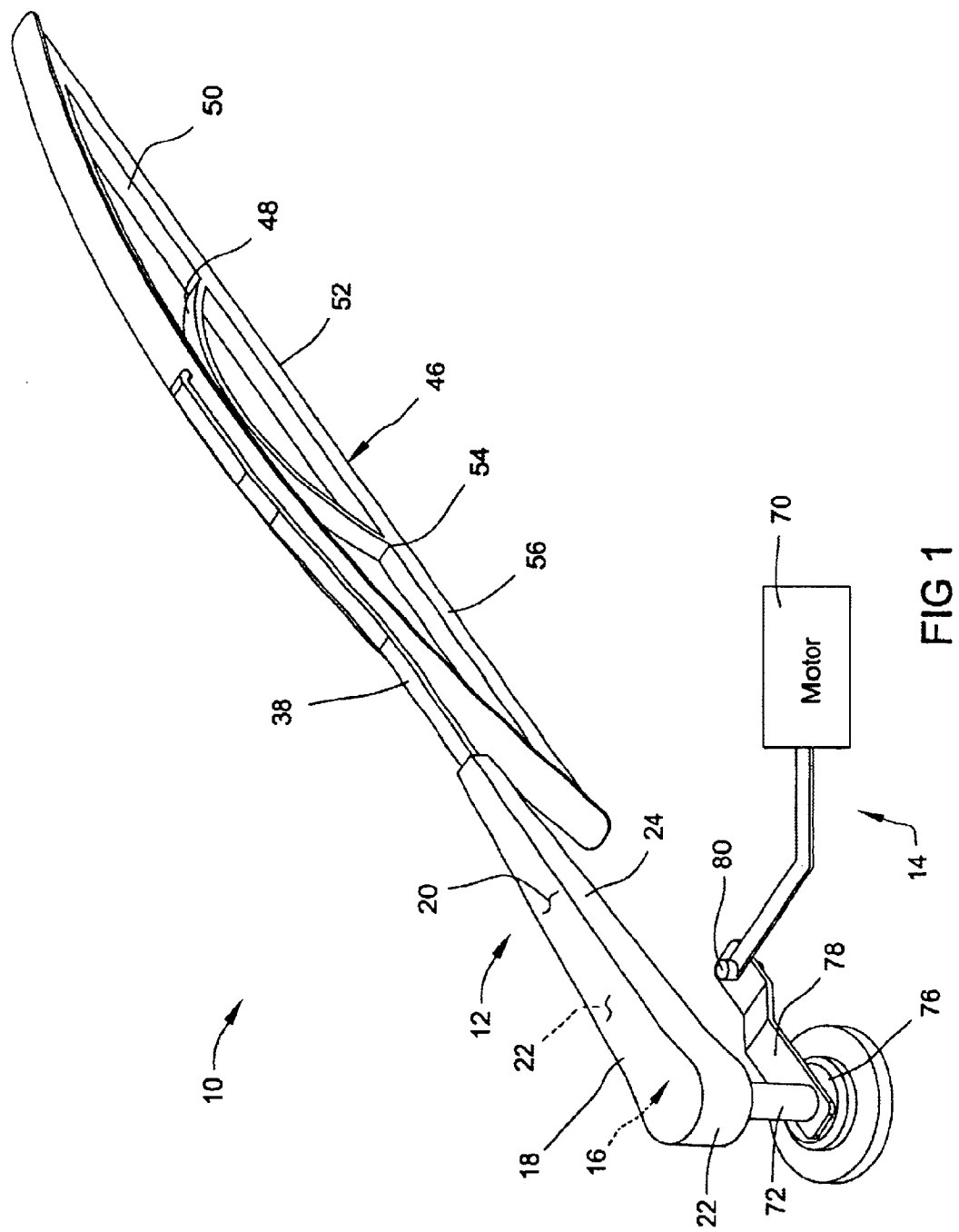
FIG. 1 is a perspective view of a wiper assembly in accordance with the principals of the present invention.
Figure 1A:
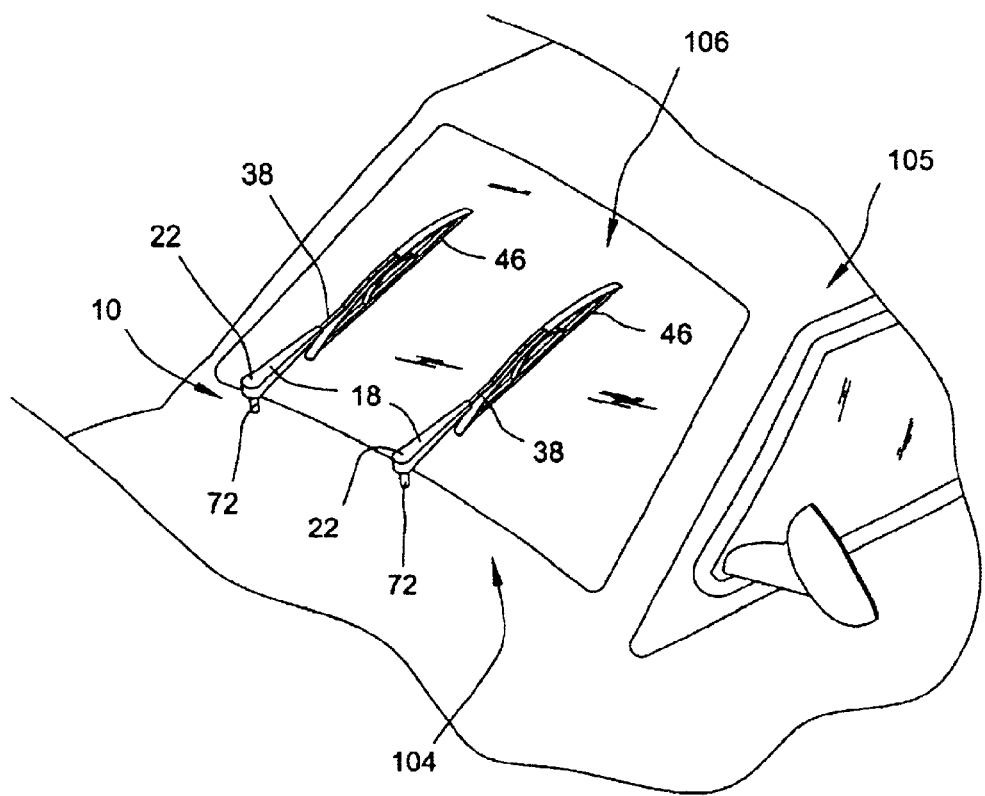
FIG. 1A is a perspective view of the wiper assembly of FIG. 1 mounted to a vehicle.

With reference to the FIG. 1, a wiper system 10 is provided and includes a wiper arm assembly 12, a drive assembly 14, and a separator assembly 16. The wiper arm assembly 12 is pivotably supported by the drive assembly 14 and is in communication with the separator assembly 16, whereby the separator assembly 16 is operable to selectively lift the wiper arm assembly 12 relative to the drive assembly 14.

The wiper arm assembly 12 includes a housing 18, a wiper blade 46, and a base 22. The housing 18 is an elongate member having first and second surfaces 20 and 22, and first and second flanges 24 and 26. The first and second flange 24 and 26 extend generally from the first surface 20 such that an interior surface 28 of each flange cooperates with the second surface 22 to form a channel (not shown). In addition, the first and second surface 20 and 22 include a first portion 32 having a generally constant cross-section and a second portion 34, whereby the second portion 34 extends form the first portion 32 and inclues a taper 36 extending along its length. The first portion 32 further includes a first and second extension 25 and 27 having an attachment aperture 29 formed therethrough for pivotal connection to the base 22. Taper 36 serves to effectively reduce the cross-section of the housing 18 gradually between the fist portion 32 and the second portion 34 of the housing 18 in an effort to provide a mounting location for an attachment bracket 38.

The attachment bracket 38 is an elongate member having a first end fixedly attached to the second portion 34 of the housing 18 and a second end including an attachment hook 40. Specifically, the first end of the attachment bracket 38 is matingly received by the channel generally at the second portion 34 and is fixedly attached thereto by a suitable means such as, but not limited to, epoxy, mechanical fastening, or welding. The attachment bracket 38 is formed from a suitable material such as steel such that the attachment bracket 38 maintains rigidity along its length. The hook 40 includes a recess 42 formed between an extension 44 and the main body of the attachment bracket 38. The hook 40 is designed to releasably attach the wiper blade 46 to the attachment bracket 38 for movement therewith, as will be discussed further below. It should be understood that while the attachment bracket 38 is disclosed as being formed from steel, any suitable material such as composite material which demonstrates sufficient rigidity and resistance to bending, is anticipated and should be considered as part of the present invention.

The wiper blade 46 includes a support structure 48 and a flexible member 50 extending along its length. The support structure 48 is a generally flexible structure and is adapted to be received by the hook 40 such that the wiper blade 46 is fixedly supported by the attachment bracket 38. In this manner, the wiper blade 46 is fixed for movement with the attachment bracket 38 and housing 18. The wiper blade 46 extends from the support structure 48 generally away from the hook 40, whereby the flexible member 50 is disposed at a distal end of the support structure 48, as best shown in FIG. 1. It should be noted that while the flexible member 50 is fixedly supported by the structure 48, the flexible member 50 is permitted to move relative the support structure 48 due in part to the flexible nature of member 50 and also by the flexible nature of the support structure 48.

In one embodiment, the flexible member 50 is formed from extruded rubber and includes an engagement flange 52, an attachment ridge 54, and a wall 56. The attachment ridge 54 is fixedly supported by the support structure 48 and is generally received by a mating channel (not shown) formed in the support structure 48. The engagement flange 52 is generally formed opposite the attachment ridge 54, whereby the wall 56 extends therebetween. It should be noted that while the flexible member 50 is disclosed as being formed from extruded rubber, any suitable material demonstrating flexible characteristics and formed by a process other than extrusion is anticipated and should be considered as part of the present invention.

Figure 5:
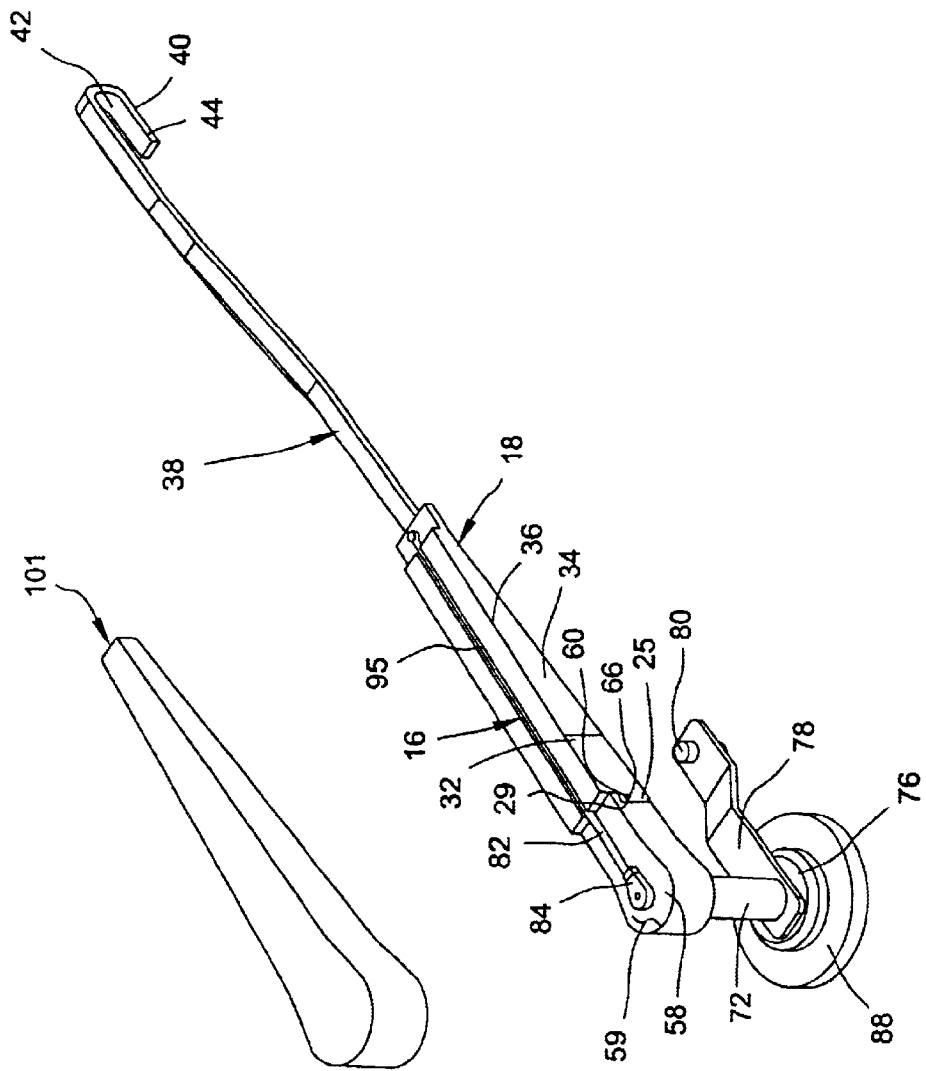
FIG. 5 is a partial exploded view of a wiper assembly showing the internal components of a separator mechanism of the wiper assembly of FIG. 2.

The housing 18 is pivotably supported by the base 22 generally at the first portion 32, as best shown in FIG. 5. The base 22 includes a main body 58 having a first surface 59 and an attachment aperture (not shown) formed therethrough. In addition, the main body 58 includes an extension 62 having an attachment aperture (not shown) operable to pivotably attach the base 22 to the housing 18. The extension 62 is generally recessed from an outer surface of the main body 58 to provide clearance for the housing 18, as will be discussed further herein below. The attachment aperture 60 aligns with the attachment aperture 29 of the first and second flange 24 and 26 for pivotal attachment thereto. In this manner, the outer surface of the main body 58 is generally flush with an outer surface of the first and second flange 24 and 26 due to the recessed relationship between the extension 62 and the main body 58.

Figure 4A:
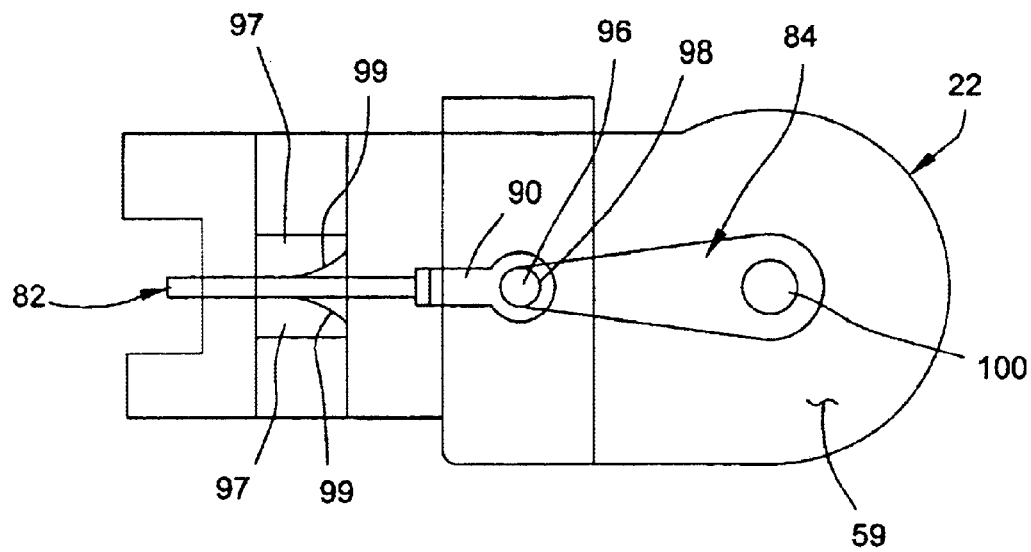
FIG. 4A is a more detailed view of particular components of FIG. 2 in a first position.
Figure 4B:
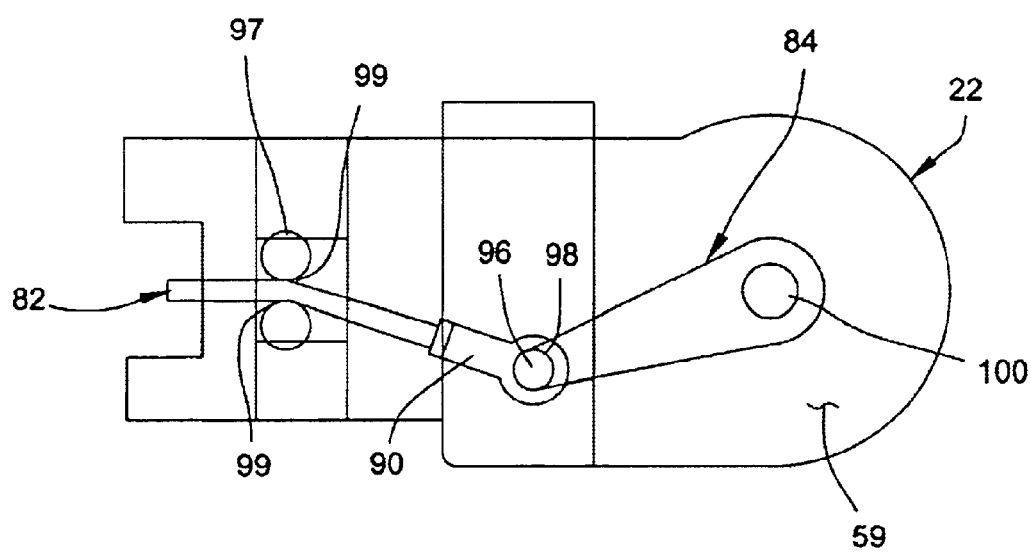
FIG. 4B is a more detailed view of particular components of FIG. 2 in a second position.

A rivet 66 is provided to pivotably attach the housing 18 to the base 22 through the attachment aperture of the main body 58 and attachment aperture 29 of the housing 18. In this regard, the housing 18 pivots about rivet 66 relative the base 22. The housing 18 is moveable between a first position wherein the first surface 20 of the housing 28 is generally flush with the first surface 59 of the main body 58 and a second position wherein the first surface 20 of the housing 18 is moved into an angular position with the first surface 59 of the main body 58. The first position of the housing 18 is best shown in FIG. 3 while the second position is best shown in FIG. 4.

The wiper assembly further includes a spring (not shown) fixedly attached at a first end to the second surface and at a second end to the base 22. The spring serves to bias the housing 18 in a first direction or counterclockwise relative the view in FIG. 3. In this manner, the housing 18 is biased into the first position such that the first surface 20 is generally flush with the first surface 59 of the base 22. To move the housing 18 from the first position to the second position a force is applied to the housing 18 to move the housing 18 against the bias of spring. It should be noted that once the force is released from the housing 18 the spring will once again bias the housing 18 back to the first position.

The drive assembly 14 fixedly supports the wiper arm assembly 12 and includes a drive motor 70 in communication with a drive shaft 72. The drive motor 70 is electrically driven by an outside electrical source and includes a moveable member and a socket (neither shown) disposed on a distal end of the moveable member. In one embodiment, the moveable member is a piston (not shown), whereby the piston is selectively driven by an electrical signal and capable of imparting an axial force in response to an electrical signal. The shaft 72 is an elongate member having a bore formed therethrough. The shaft 72 is fixedly attached to the wiper arm assembly 12 at the base 22 at a first end and rotatably attached to a base 76 at a second end. In this manner, the shaft 72 rotates within the base 76 while concurrently rotating the wiper arm assembly 12. The shaft 72 further includes an arm 78 fixedly attached thereto and a ball 80 non-rotatably attached at a distal end of the arm 78. The ball 80 is rotatably attached to the socket of the piston such that as the piston imparts an axial force on the arm 78, the cooperation of the ball 80 and socket serves to rotate the shaft 72 within the base 80, as best shown in FIG. 1.

In one embodiment, the separator assembly 16 includes a steel cable 82, a cam 84, a cam shaft 86, and a clutch 88. The steel cable 82 is an elongate cylindrically shaped member capable of transmitting a tensile force while further maintaining predetermined bending characteristics along its length. Specifically, the cable 82 is constructed of a plurality of steel threads intertwined and braided to form a single cable, whereby each steel thread is permitted to flex and bend relative one another while at the same time cooperating to adequately transmit a tensile force as a single unit. It should be noted that while a steel cable is disclosed, any other material capable of transmitting a tensile force while concurrently having suitable bending characteristics such as nylon is anticipated and should be considered as part of the present invention.

The cable 82 includes a first and second end each having an attachment bracket 90, whereby the attachment bracket 90 includes an attachment aperture 92 formed therethrough. The first end of the cable 82 is fixedly attached generally at the second end of the housing 18 through the interaction of the attachment aperture 92 and a fastener 94. The fastener 94 fixedly attaches the bracket 90 to the housing 18 such that the first end of the cable 82 is not permitted to move relative the housing 18. The second end of the cable 82 is fixedly attached to the cam 84 by another fastener 96 received by the attachment aperture 92 of bracket 90 such that the attachment bracket 90 is permitted to rotate about the fastener 96. In this manner, the second end of the cable 82 is permitted to rotate relative the cam 84 about the fastener 96 while the first end of the cable 82 is fixed to the housing 18 and is not permitted to rotate relative thereto.

The cable 82 is received by a slot 95 formed in the first surface 20 of the housing 18 and is permitted to translate therein, as best shown in FIG. 5. The cable 82 is further received between a pair of posts 97 fixedly attached to the housing 18, whereby the cable 82 reacts against the posts 97 during actuation of the separator assembly 16, as will be discussed further below. Alternatively, the posts 97 may be formed integrally with the housing 18, and may include a generally cylindrical shape or may be formed by a slot having a generally tapered edge, as best shown in FIG. 4. While a cylindrical shape and a tapered edge are disclosed, it should be understood that any shape facilitating movement of the cable 82 relative the posts 97 such as an arcuate surface is anticipated and should be considered as part of the present invention. In either case, the posts 97 include a reaction surface 99 generally along their length for interaction with the cable 82. In addition, a cover 101 is provided and is fixedly received by the housing 18 to ensure that the cable 82 is maintained within the slot 95.

The cam 84 includes a first aperture 98 for receiving fastener 96 and a second aperture 100 for attachment to the shaft 86. As previously described, the cam 84 is permitted to rotate relative the second end of the cable 82 about the fastener 96 such that movement of the cable 82 will not necessarily rotate the cam 84. The second aperture 100 receives the shaft 86 and is fixed for rotation therewith.

The shaft 86 includes a first and second end and is rotatably received within the drive shaft 72. The first end of the shaft 86 is fixedly attached to the cam 84 while the second end of the shaft 86 is fixedly attached to a clutch plate 102 for selective attachment to the clutch 88. Specifically, the clutch 88 engages the clutch plate 102 in response to an outside input such as an electrical signal, whereby the electrical signal causes the clutch 88 to move towards and frictionally engage the clutch plate 102 to prevent rotation of the clutch plate 102 and shaft 86 relative the drive shaft 72.

With reference to FIGS. 2–5 and 6A–6E, the operation of the wiper system 10 will be described in detail. In normal operation, the drive motor 70 and clutch 88 are fixedly attached to an outside structure such as a plenum 104 of a vehicle 105. The drive motor 70 cooperates with the ball 80 to rotate the arm 78 and drive shaft 72. Rotation of the drive shaft 72 causes the base 22 to rotate, thereby causing the housing 18 and attachment bracket 38 to rotate therewith. In this manner, the housing 18 and attachment bracket 38 articulate or sweep over a predetermined portion of a vehicle windshield 106 in response to the interaction of the drive motor 70 and the arm 78.

Articulation of the housing 18 and attachment bracket 38 cause the wiper blade 46 to engage the windshield 106 and concurrently sweep over the predetermined portion of the windshield 106, thereby removing any debris such as water or leaves that may be in the path of the wiper system 10. Under this condition, the shaft 86 is permitted to rotate within the drive shaft 72 and does so due to the interaction between the cable 82 and the housing 18. Specifically, as the housing 18 rotates under force from the drive motor 70, the cable 82 translates within the slot 95, thereby rotating the cam 86 and the shaft 86.

Figure 6A:
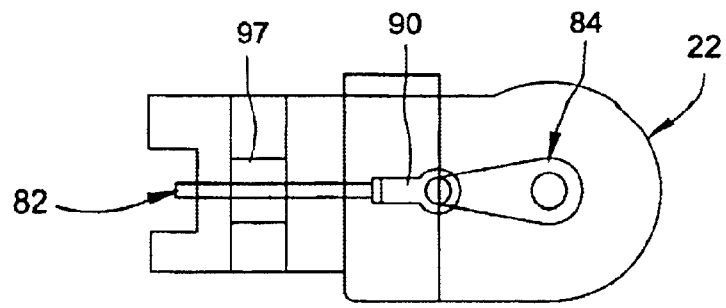
FIG. 6A is a top view of the separator mechanism of FIG. 5 in accordance with the principals of the present invention in a first position.
Figure 6B:
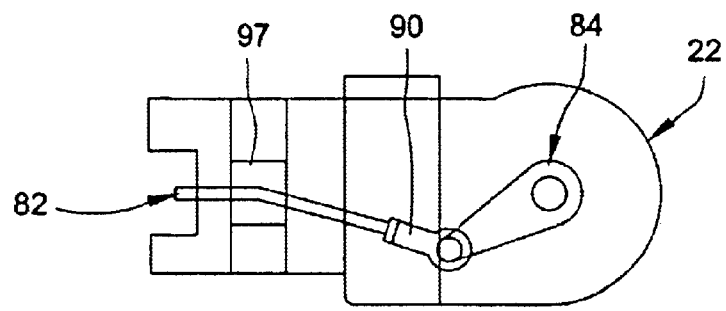
FIG. 6B is a top view of the separator mechanism of FIG. 5 in accordance with the principals of the present invention in a second position.
Figure 6C:
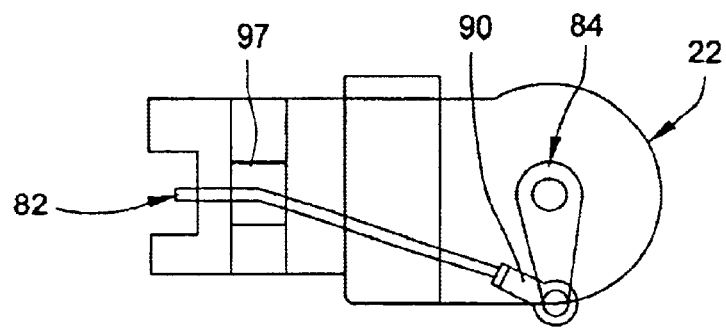
FIG. 6C is a top view of the separator mechanism of FIG. 5 in accordance with the principals of the present invention in a third position.
Figure 6D:
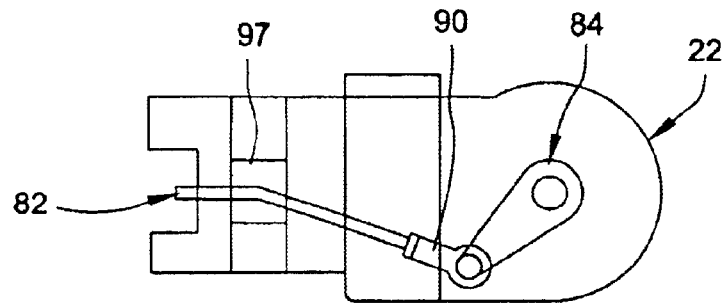
FIG. 6D is a top view of the separator mechanism of FIG. 5 in accordance with the principals of the present invention in a fourth position.
Figure 6E:
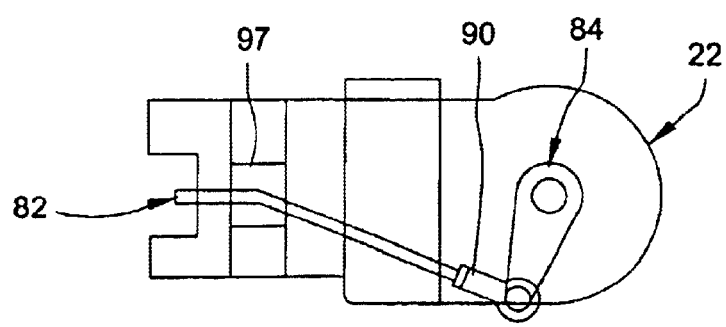
FIG. 6E is a top view of the separator mechanism of FIG. 5 in accordance with the principals of the present invention in a fifth position.

Under normal conditions, the housing 18 is in a stowed position generally parallel to a bottom edge of the windshield 106. In this position, the cam 84 is in a first position as represented by FIG. 6A. As the housing 18 is rotated by the drive motor 70 the housing 18 rotates from the stowed position and articulates over the surface of the windshield 106. Through rotation of the housing 18, a tensile force is applied to the cable 82 as the housing 18 rotates. This tensile force causes the cam 84 to rotate throughout the range of movement as represented by FIGS. 6B–6E. The fully extended position of the housing 18 is represented by FIG. 2 while FIG. 6E represents the corresponding position of the cam 84 when the housing 18 is in the fully extended position. When the housing 18 rotes back to the stowed position, the cam 84 is again caused to rotate throughout the positions shown in FIGS. 6B–6E until finally reaching the stowed position as represented by FIG. 6A.

To lift the housing 18 against the bias of spring, a force is applied to the cable 82 through the interaction of the clutch 88 and the clutch plate 102. Specifically, in response to an outside signal, the clutch 88 will engage the clutch plate 102, thereby preventing rotation of the shaft 86 relative the drive shaft 72. In this manner, the cam 84 is not permitted to rotate relative the base 22.

As the base 22 is caused to rotate through the interaction of the drive motor 70 and the drive shaft 72, the shaft 86 is not permitted to rotate therewith. In this manner, the cam 84 is held in the position as shown in FIG. 6A as the housing 18 is caused to rotate relative thereto. Sufficient rotation of the housing 18 causes the cable 82 to engage the reaction surface 99 one of the posts 97. Interaction with the post 97 caused by the restriction in movement of the cam 84 causes a tensile load to be applied to the cable 82. The tensile load applied to the cable 82 causes the interaction between the post 97 and the cable 82 to lift the wiper blade 46 from contact with an outer surface of the windshield 106 against the bias of the spring. In this position, the wiper blade 46 is lifted from contact with the windshield 106 such that any debris trapped between the blade 68 and the outer surface of the windshield 106 may be removed. Once the debris is removed, a signal can be supplied to the clutch 88 to disengage the clutch plate 102 and once again allow rotation of the cam 84 and permit normal operation of the wiper system 10.

Rotation of the cam 84 will release the tension from the cable 82, thereby allowing spring to return the wiper blade 46 into engagement with the windshield 106. As can be appreciated, return of the wiper blade 46 to the outer surface of the windshield 106 under the bias of spring may involve a significant force. To mitigate the effects of the this return force, a damper 108 may be provided as shown in FIG. 16 to receive housing 18. The damper 108 may be a conventional shock absorber or may include a deformable material. In either case, the damper 108 is operable to receive the housing 18 upon return of the housing 18 to a normal use position and to alleviate the potential harsh force exerted by the spring on the housing 18.

In addition, the wiper system 10 may be provided with a position sensor 110 as shown in FIG. 15 to ensure that the housing 18 will contact the damper 108 or to ensure that the wiper blade 46 will return to a specific portion of the windshield 106. Specifically, the position sensor 110 will operate to identify the position of the base 22. By feeding this information to the clutch 88 via a central processing unit 113, the wiper blade 46 will contact the windshield 106 on return from a lifted or separated position at a specific and predetermined location as the clutch 88 will only disengage the clutch plate 102 when the base 22 is in a predetermined position. In this manner, the windshield 106 may be locally reinforced as the return position of the wiper blade 46 can be controlled.

In another embodiment, a wiper system 10a includes a separator assembly 16a having a housing 112, a piston 114, and a fluid source 116. In view of the substantial similarity in structure and function of the components associated with the wiper system 10 with respect to the wiper system 10a, like reference numerals are used hereinafter and in the drawings to identify like components while like reference numerals containing letter extensions are used to identify those components that have been modified.

The housing 112 includes a bore 118 formed therein and a pivot aperture 120. The bore 118 includes a first end having a generally arcuate surface 125 and a second end including a stop 122 having a reaction surface 123 integrally formed therewith. In addition, the bore 118 includes an outlet 124 operable to matingly receive the piston 114, as will be described further below. The pivot aperture 120 receives a fastener (not shown) for pivotal attachment to the housing 18a. In this manner, the housing 18a is permitted to rotate relative to the separator 16a through a clearance formed in a bottom surface of the housing 18a. The housing 18a pivots about pivot aperture 102 relative the housing 112, whereby the housing 112 is disposed within the housing 18a in a normal use position.

The housing 18a further includes a ramped surface 126 having a reaction surface 128 disposed along its length. The ramped surface 126 is formed integral with the housing 18a and is disposed generally opposite the second portion 34 of the housing 18a. In this manner, the attachment bracket 38 and wiper blade 46 are disposed at an opposite end of the housing 18a from the ramped surface 126. The housing 18a is rotated through the interaction of the housing 112 with the drive shaft 72. Specifically, the drive shaft 72 is received by the housing 112 and is fixed for rotation therewith. The drive shaft 72 is directly linked to the drive motor 70, whereby the drive motor 70 is operable to selectively rotate the drive shaft 72.

The piston 114 includes a head 130 and a cylindrical shaft 132 having an engagement surface 133. The cylindrical shaft 132 is fixedly mounted to a first surface of the head 130 at a first end and includes the engagement surface 133 at a second end. The head 130 is matingly received by the bore 118 and translates therein while the cylindrical shaft 132 is matingly received by the outlet 124 of the bore 118 and translates therein in response to movement of the head 130. In addition, the piston 114 includes a spring 134 which biases the head 130 toward the arcuate surface 125 of the bore 118. The spring 134 engages the head 130 generally at the first surface and engages the stop 122 at a second end.

Figure 7:
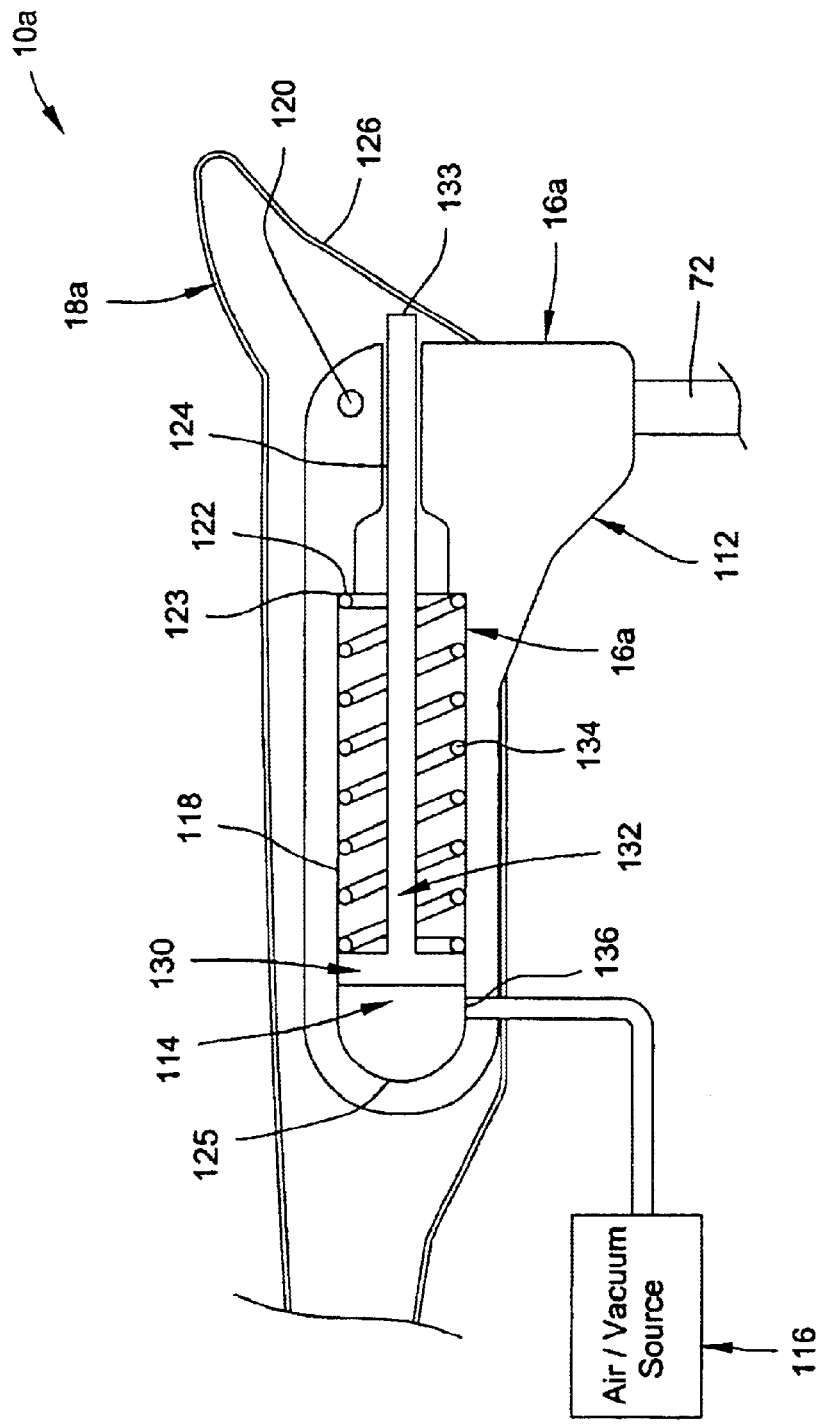
FIG. 7 is a side view of a second embodiment of a wiper assembly with part of a housing removed to show the internal components of the wiper assembly in an engaged position.

To translate the piston 114 along the length of the bore 118 between an engaged position and a disengaged position, a fluid port 136 in communication with the fluid source 116 is provided generally between the arcuate surface 125 and a second surface of the head 130, as best shown in FIG. 7. In this manner, the fluid source 116 is capable of selectively supplying pressurized fluid between the second surface of the head 130 and the arcuate surface 125. Once enough pressure is built up in this region, the head 130 will translate within the bore 118 against the bias of the spring 134. Concurrently, the cylindrical shaft 132 will translate within the outlet 124 in response to movement of the head 130 until a point where the engagement surface 133 contacts the ramped portion 126, as best shown in FIG. 8.

Figure 8:
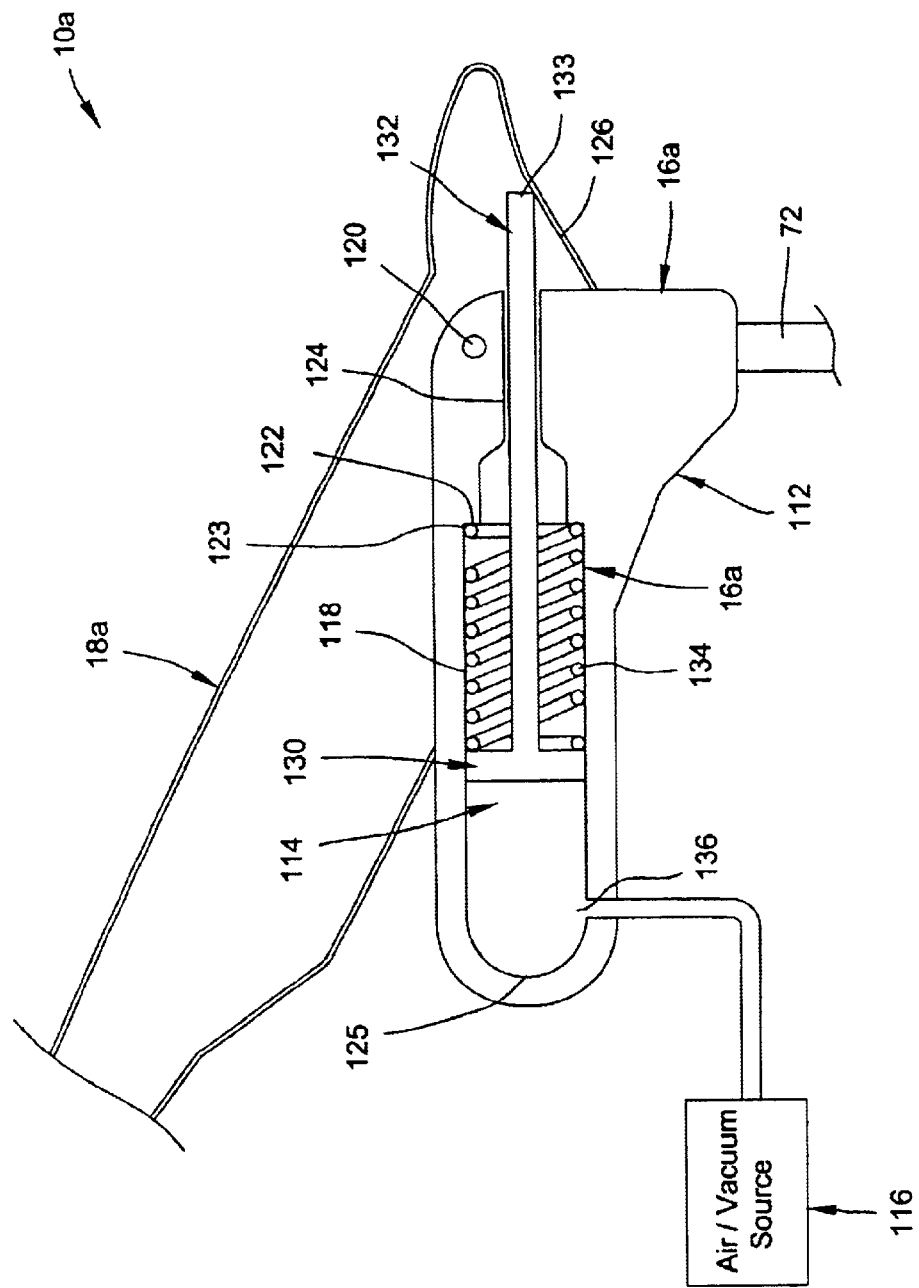
FIG. 8 is a side view of a second embodiment of a wiper assembly with part of a housing removed to show the internal components of the wiper assembly in a disengaged position.

With reference to FIG. 8, the operation of the wiper system 10a will be described in detail. As previously described, under normal operation, the wiper blade 46 is articulated across the windshield 106 through the interaction of the drive shaft 72 and the housing 112. In this manner, articulation of the housing 112 causes similar movement of the housing 18a and attachment bracket 38, thereby causing the wiper blade 46 to engage the windshield 106 and concurrently sweep over the predetermined portion of the windshield 106 and remove any debris such as water or leaves that may be in the path of the wiper system 10a.

To remove the wiper blade 46 from contact with the windshield 106, a signal is transmitted to the fluid source 116 such that pressurized fluid is caused to fill the space between the arcuate surface 125 and the second surface of the head 130. When sufficient pressure is achieved, the head 130 will translate within the bore 118 generally away from the arcuate surface 125. Sufficient translation of the head 130 will cause the engagement surface 133 of the cylindrical shaft 132 to engage and move up the ramp 126. The movement of the engagement surface 133 up the ramp 126, as caused by the translation of the head 130 within the bore 118, causes the housing 18a to pivot about pivot aperture 120 and lift the wiper blade 46 from contact with the windshield 106.

To return the wiper blade 46 to the windshield 106, the fluid source 116 reduces the pressure of the fluid, thereby allowing the spring 134 to translate the head 130 toward the arcuate surface 125 of the bore 118. Sufficient translation of the head 130 toward the arcuate surface 125 will cause the engagement surface 133 of the cylindrical shaft 132 to travel down the ramp 126 and return the wiper blade 46 to the normal use position, as best shown in FIG. 7.

In another embodiment, a wiper system 10b includes a separator assembly 16b having a cam 138 operable to facilitate movement of the wiper blade 46, whereby the piston 114 engages the cam 138 to rotate the housing 18b about the pivot aperture 120. In view of the substantial similarity in structure and function of the components associated with the wiper system 10 with respect to the wiper system 10b, like reference numerals are used hereinafter and in the drawings to identify like components while like reference numerals containing letter extensions are used to identify those components that have been modified.

Figure 9:
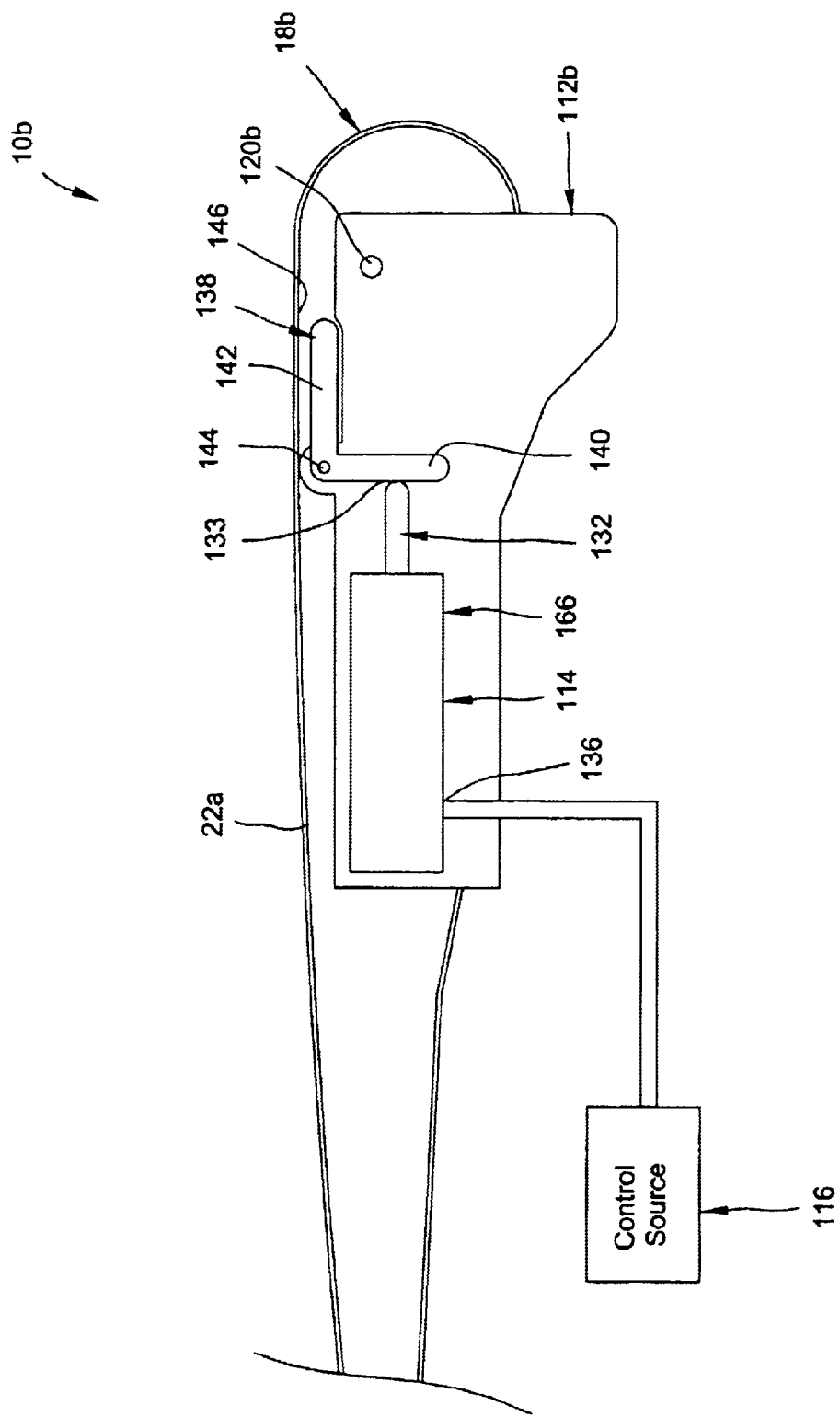
FIG. 9 is a side view of a third embodiment of a wiper assembly with part of a housing removed to show the internal components of the wiper assembly in an engaged position.
Figure 10:
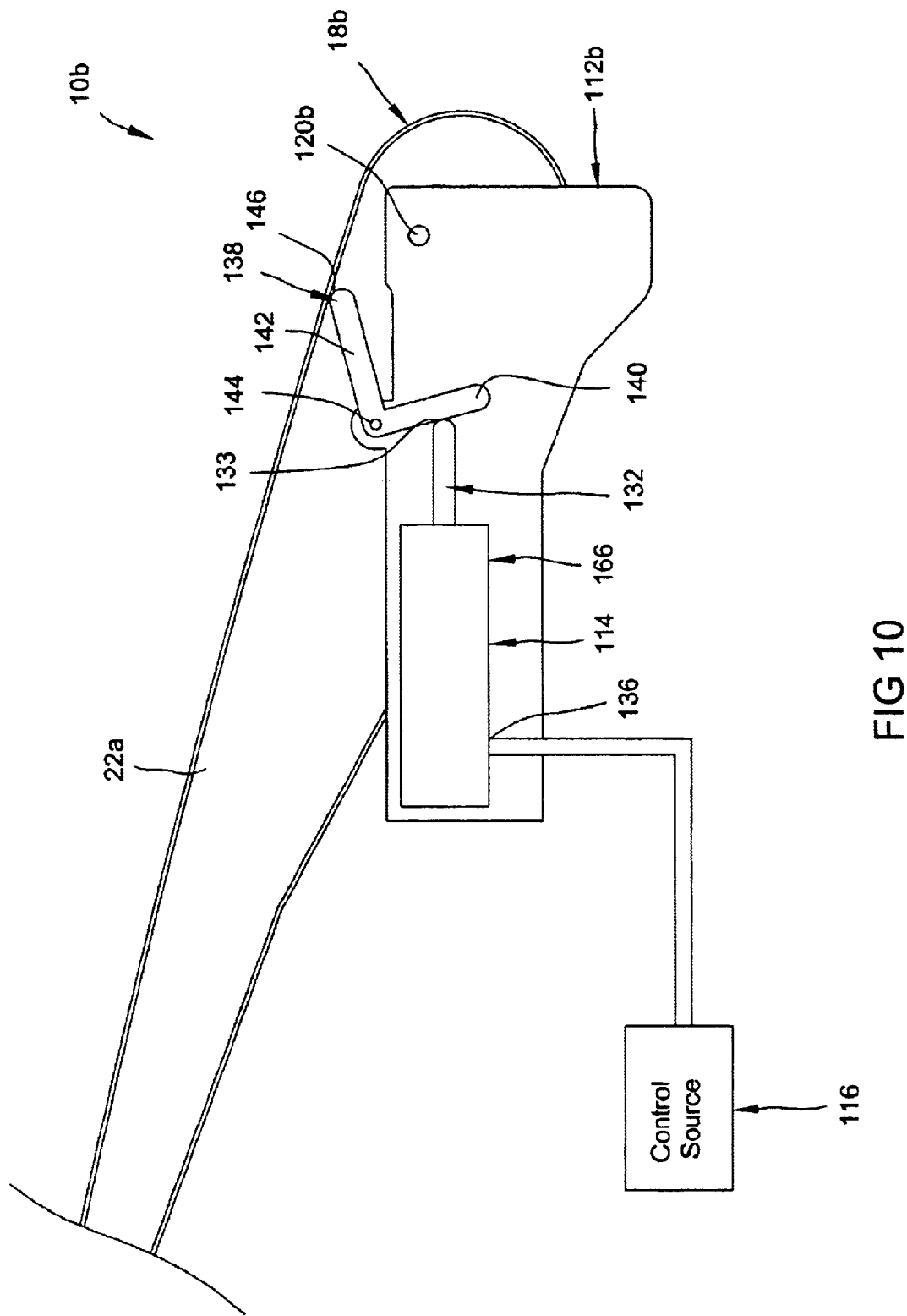
FIG. 10 is a side view of a third embodiment of a wiper assembly with part of a housing removed to show the internal components of the wiper assembly in a disengaged position.
Figure 11:
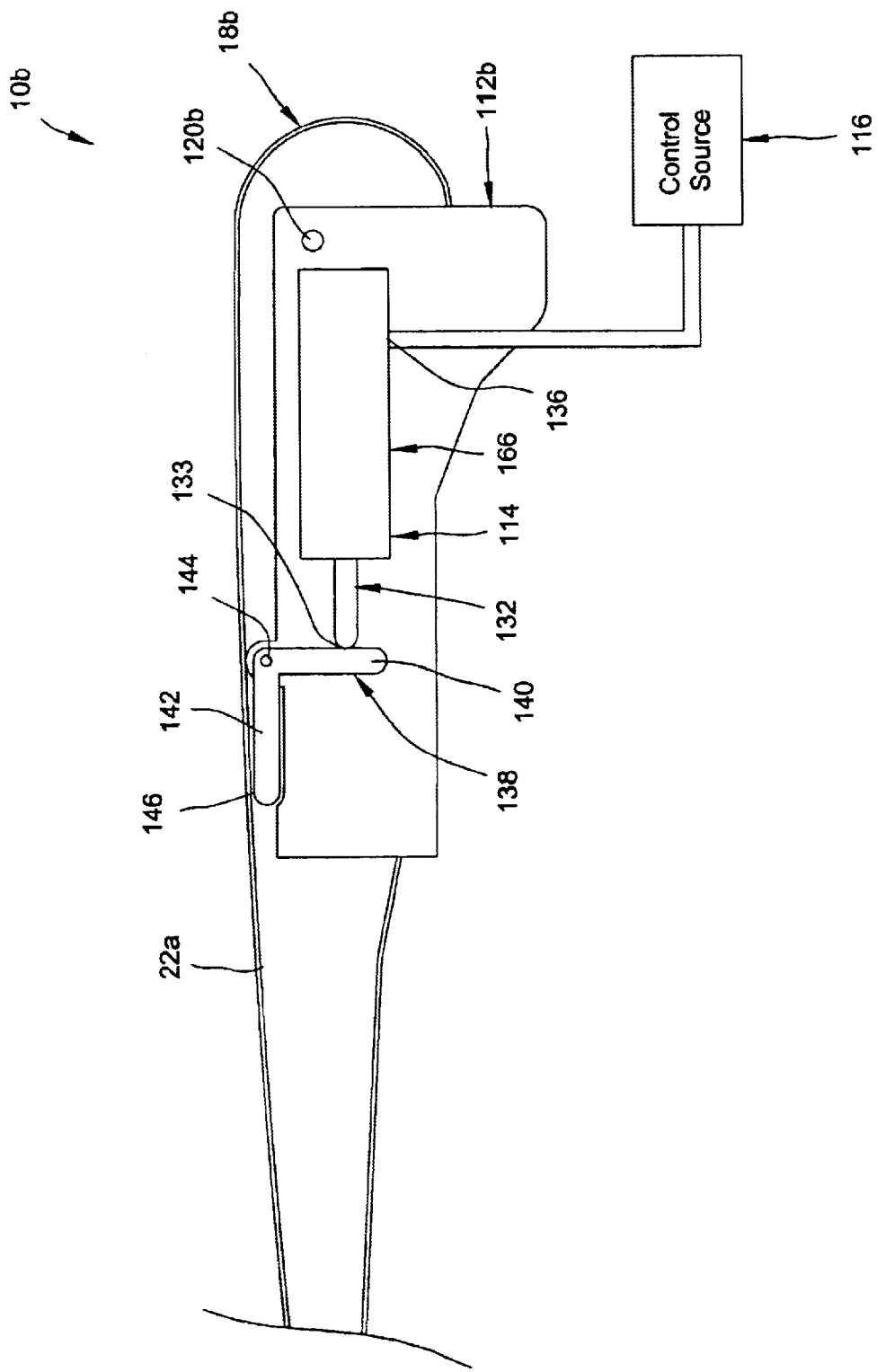
FIG. 11 is a side view of a fourth embodiment of a wiper assembly with part of a housing removed to show the internal components of the wiper assembly in an engaged position.
Figure 12:
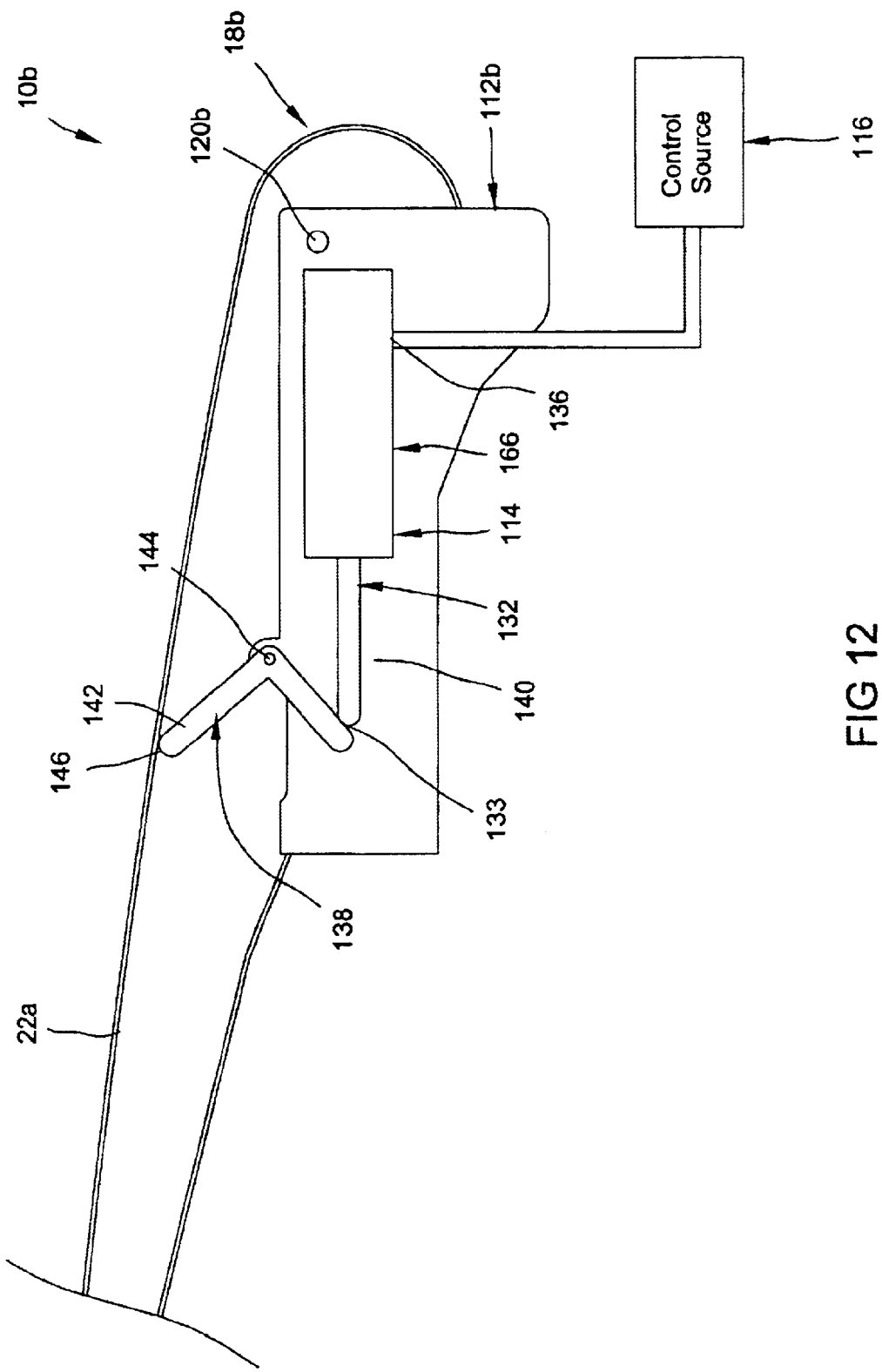
FIG. 12 is a side view of a fourth embodiment of a wiper assembly with part of a housing removed to show the internal components of the wiper assembly in a disengaged position.

The cam 138 includes a first and second arm 140, 142 and an pivot aperture 144 for pivotable attachment to the housing 112b. Specifically, movement of the piston 114 in response to fluid pressure from the fluid source 116 will cause the cylindrical shaft 132 to contact the first arm 140 of the cam 138. Engagement of the cylindrical section 132 with the cam 138 will cause the cam 138 to rotate in a counterclockwise direction relative to the view shown in FIG. 9 about the pivot aperture 144. Sufficient rotation of the cam 138 by the cylindrical shaft 132 will cause a second arm 142 of the cam 138 to engage a reaction surface 146 of an inner surface 22a of the housing 18b and thereby pivot the housing 18b about the pivot aperture 120b against the bias of the spring. While the cam 138 has been described as being rotated in a counterclockwise direction it should be understood that the cam 138 and the piston 114 could be disposed in such a manner such that clockwise rotation of the cam 138 causes pivotal movement of the housing 18b relative the housing 112b as best shown in FIGS. 11 and 12.

In yet another embodiment, a wiper system 10c includes a separator assembly 16c having a gear assembly 146. Gear assembly 146 serves to facilitate pivotal movement of the housing 18c relative the housing 112c to selectively disengage the wiper system 10c from the windshield 106. Again, in view of the substantial similarity in structure and function of the components associated with the wiper system 10 with respect to the wiper system 10c, like reference numerals are used hereinafter and in the drawings to identify like components while like reference numerals containing letter extensions are used to identify those components that have been modified.

The gear assembly 146 includes a first and second gear wheel 148 each having a plurality of teeth 150 disposed in a radial relationship from a central axis of the gear wheel 148 and a flange 152 having a reaction surface 155 fixedly connecting the first and second gear wheels 148. In addition, each gear wheel 148 includes a central aperture 153 formed therethrough for rotational attachment to the housing 112c. Specifically, a fastener (not shown) is received through the attachment apertures 152 of the gear wheels 148 and then through an attachment aperture (not shown) formed in the housing 112c to rotatably attach the gear wheels 148 to the housing 112c.

Figure 13:
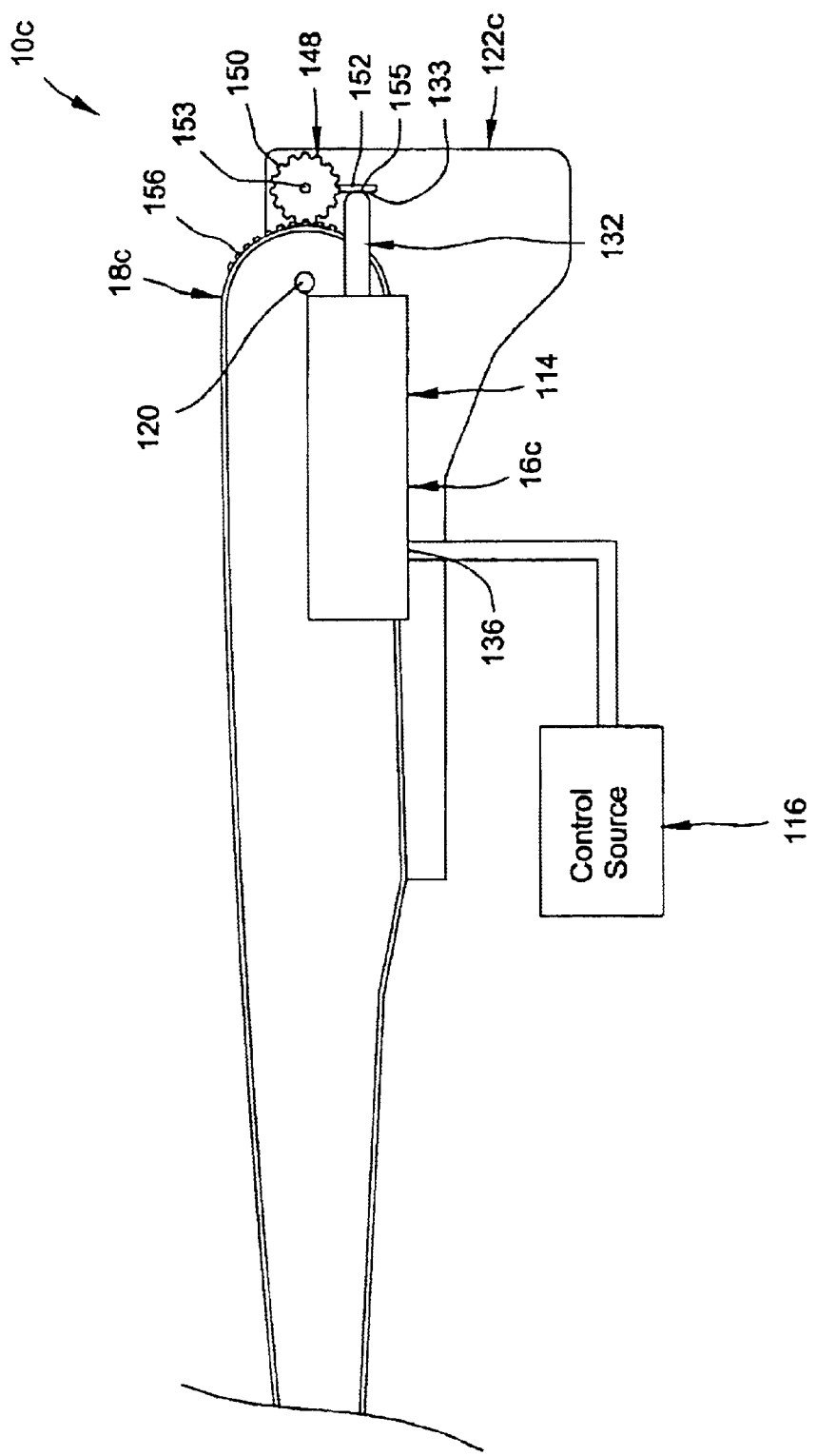
FIG. 13 is a side view of a fifth embodiment of a wiper assembly with part of a housing removed to show the internal components of the wiper assembly in an engaged position.
Figure 14:
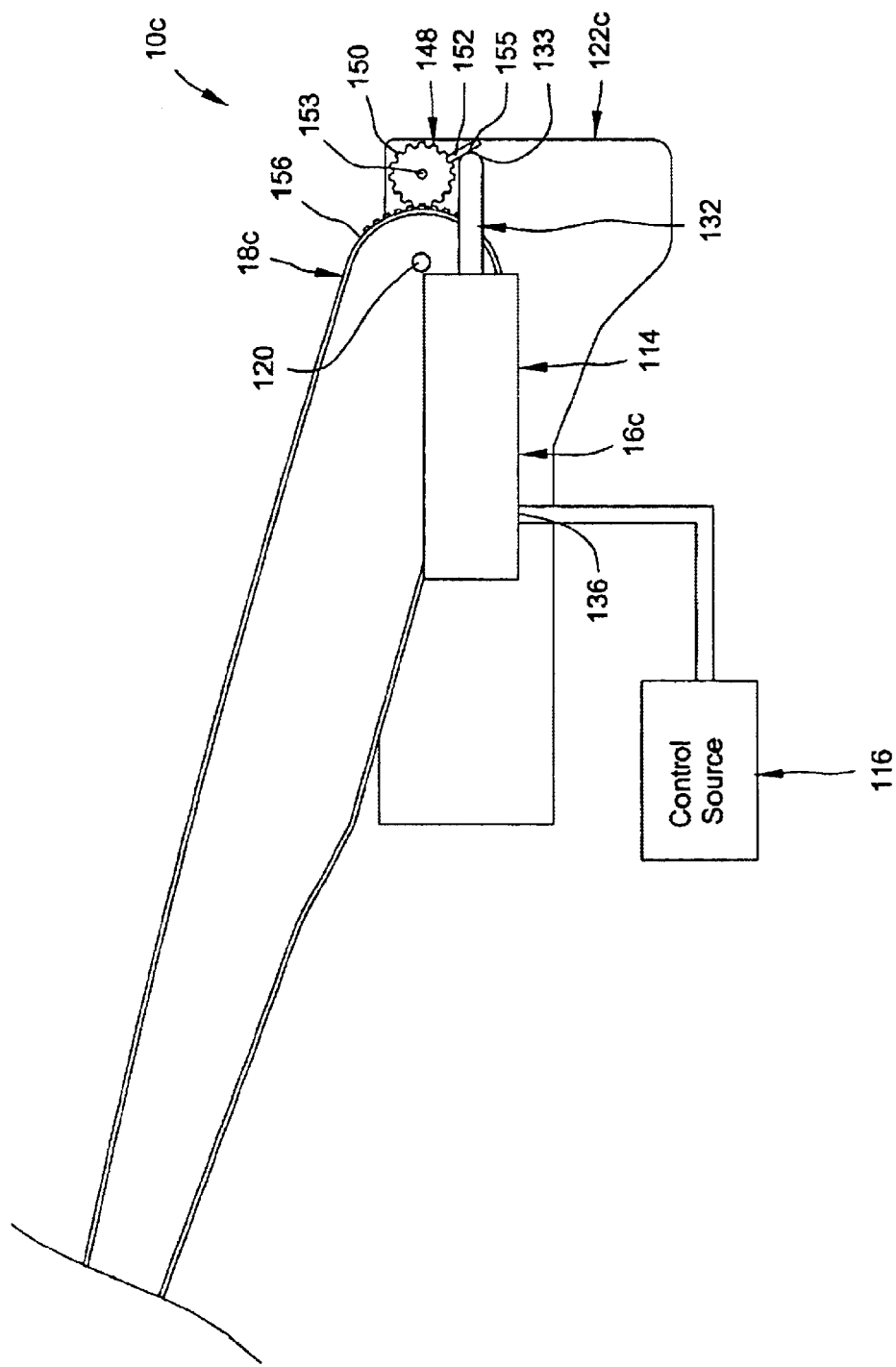
FIG. 14 is a side view of a fifth embodiment of a wiper assembly with part of a housing removed to show the internal components of the wiper assembly in a disengaged position.
Figure 19:
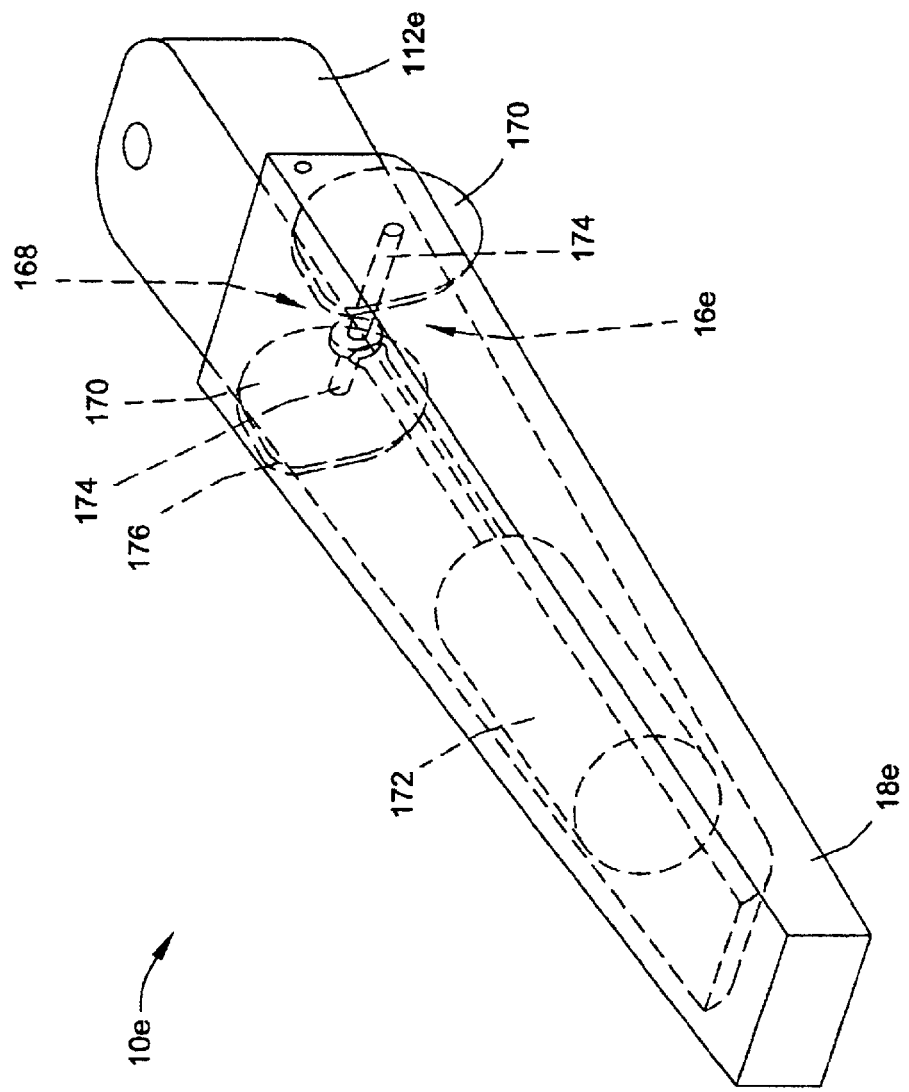
FIG. 19 is a perspective view of the wiper assembly of FIG. 17.
Figure 22:
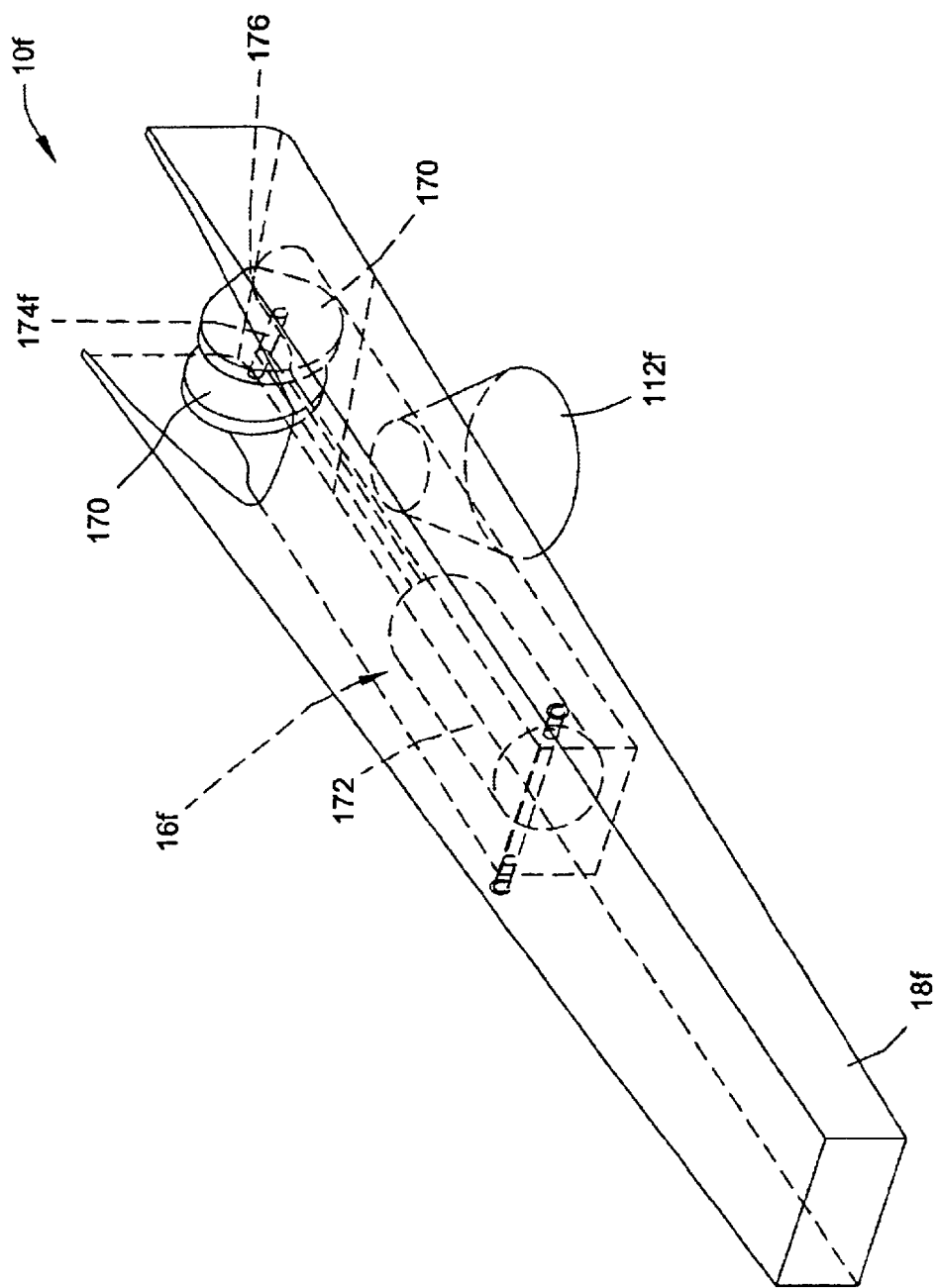
FIG. 22 is a perspective view of the wiper assembly of FIG. 20.

The housing 18c includes a plurality of teeth 156 disposed on an outer surface thereof for mating engagement with the teeth 150 of the gear wheels 148 such that as the gear wheels 148 rotate, the teeth 150 engage the teeth 156 of the housing 18c to selectively rotate the housing 18c relative the housing 112c, as best shown in FIGS. 13–14. Rotation of the gear wheels 148 is accomplished through the interaction of the cylindrical shaft 132 and the flange 152, whereby as the shaft 132 translates under pressure from the compressed fluid, the shaft 132 contacts the flange 152 at the engagement surface 155 and causes rotation thereof. Rotation of the flange 152 causes rotation of the gear wheels 148 due to the fact that the gear wheels 148 are fixed for rotation with the flange 152. Sufficient rotation of the gear wheels 148 causes the teeth of the wheels 148 to travel along teeth 156 and thereby lift the housing 18c from a stowed position as shown in FIG. 13 to a lifted or separated position as shown in FIG. 14.

In a sixth embodiment, a wiper system 10d includes a separator assembly 16d having a bladder assembly 158. Bladder assembly 158 serves to facilitate pivotal movement of the housing 18d relative the housing 112d to selectively disengage the wiper system 10d from the windshield 106. Again, in view of the substantial similarity in structure and function of the components associated with the wiper system 10 with respect to the wiper system 10d, like reference numerals are used hereinafter and in the drawings to identify like components while like reference numerals containing letter extensions are used to identify those components that have been modified.

The bladder assembly 158 includes a vacuum port 160, operable to place a chamber 162 under a constant vacuum. In addition, the bladder assembly 158 includes a piston assembly 163 having a flexible member 164 fixedly supporting a rigid post 166, whereby the flexible member 164 serves to translate the post 166 between an engaged position and a disengaged position. Specifically, when the vacuum places the chamber 162 under a vacuum, the flexible member 164 will be caused to move in a direction Z, as indicated in FIG. 15. Sufficient movement of the post 166 in the Z direction will cause the post 166 to engage the housing 18d, thereby causing the housing 18d to rotate relative to housing 112d. In this manner, the post 166 is operable to selectively raise the housing 18d relative the housing 112d in response to a sufficient vacuum pressure acting on the chamber 162. As the housing 18d is rotated relative to housing 112d, the wiper blade 46 disengages the windshield 106.

In a seventh embodiment, a wiper system 10e includes a separator assembly 16e having a cam assembly 168. Cam assembly 168 serves to facilitate pivotal movement of the housing 18e relative the housing 112e to selectively disengage the wiper system 10e from the windshield 106. Again, in view of the substantial similarity in structure and function of the components associated with the wiper system 10 with respect to the wiper system 10e, like reference numerals are used hereinafter and in the drawings to identify like components while like reference numerals containing letter extensions are used to identify those components that have been modified.

Cam assembly 168 includes a pair of cam wheels 170 operably coupled to a drive motor 172 through a rear axle 174, whereby the drive motor 172 is operable to rotate the rear axle 174 and cam wheels 170 to raise the housing 18e relative the housing 112e. Specifically, as the drive motor 172 actuates, the cam wheels 170 rotate through the interaction between the drive motor 172 and the rear axle 174. Sufficient rotation of the cam wheels 172 causes a pair of cam surfaces 176 of the cam wheels 172 to engage the housing 18e, thereby causing the housing 18e to be raised relative the housing 112e. As the housing 18e is rotated relative to housing 112e, the wiper blade 46 disengages the windshield 106.

In an eighth embodiment, a wiper system 10f includes a separator assembly 16f having a cam assembly 168f. Cam assembly 168f serves to facilitate pivotal movement of the housing 18f relative the housing 112f to selectively disengage the wiper system 10f from the windshield 106. Again, in view of the substantial similarity in structure and function of the components associated with the wiper system 10e with respect to the wiper system 10f, like reference numerals are used hereinafter and in the drawings to identify like components while like reference numerals containing letter extensions are used to identify those components that have been modified.

Cam assembly 16f is driven by a rear axle 174f, such that rotation of the cam assembly 16f causes the housing 18f to rotate relative the housing 112f. The rear axle 174f is rotatably driven by a drive motor 172, whereby the interface between the drive motor 172 and the rear axle 174f includes a gear assembly 176. Gear assembly 176 serves to facilitate rotational movement of the rear axle 174f and cam wheels 170. In this manner, gear assembly 176 causes the cam assembly 16f to raise the housing 18f relative to the housing 112f through the interaction of the cam wheels 170 and the housing 18f, whereby the power required to raise housing 18f may be reduced due to the interaction of the gear assembly 176 and the rear axle 174f.

Figure 23:
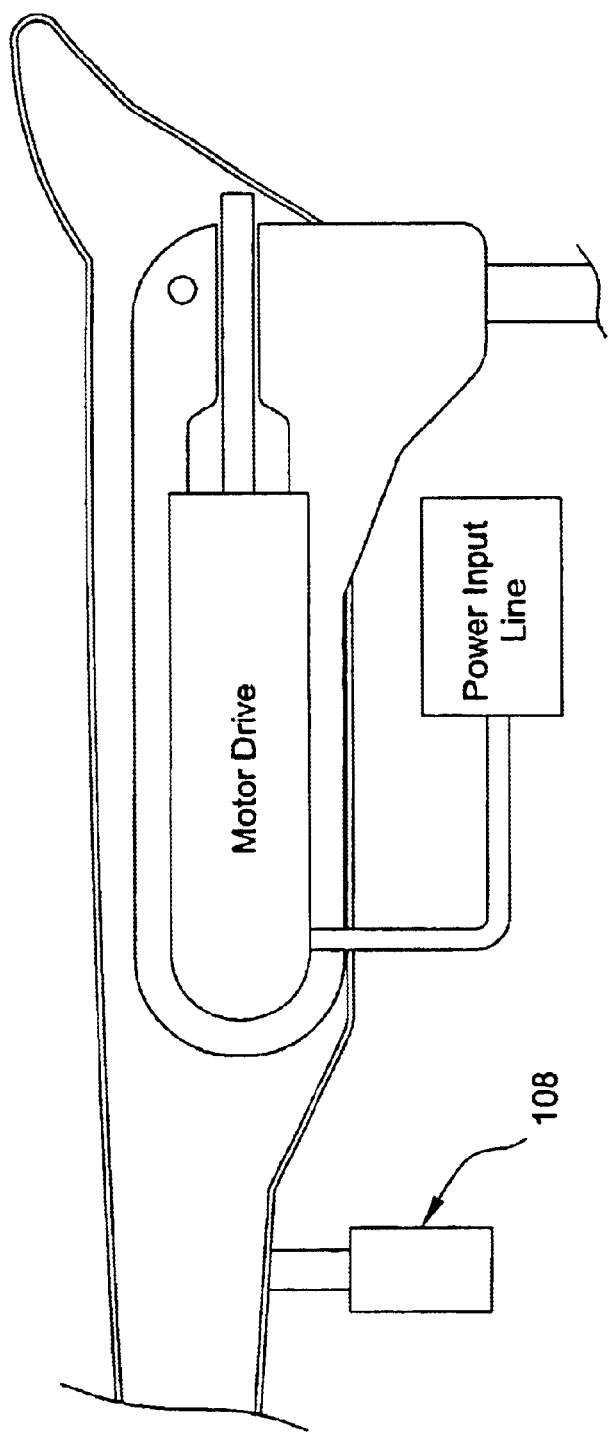
FIG. 23 is a side view of a wipe system in accordance with the principals of the present invention incorporating a damping system.

In any of the foregoing separator assemblies 16a–16f, releasing the pressurized fluid from the space generally between the arcuate surface 125 and the head 130 will allow the spring to return the wiper blade 46 into contact with the windshield 106. As can be appreciated, return of the wiper blade 46 to the outer surface of the windshield 106 under the bias of the spring may involve a significant force. To mitigate the effects of the this return force, a damper 108 may be provided as shown in FIG. 23 to receive housing 18a–f. The damper 108 may be a conventional shock absorber or may include a deformable material. In either case, the damper 108 is operable to receive the housing 18a–f upon return of the housing 18a–f to a normal use position and to alleviate the potential harsh force exerted by the spring.

Figure 24:
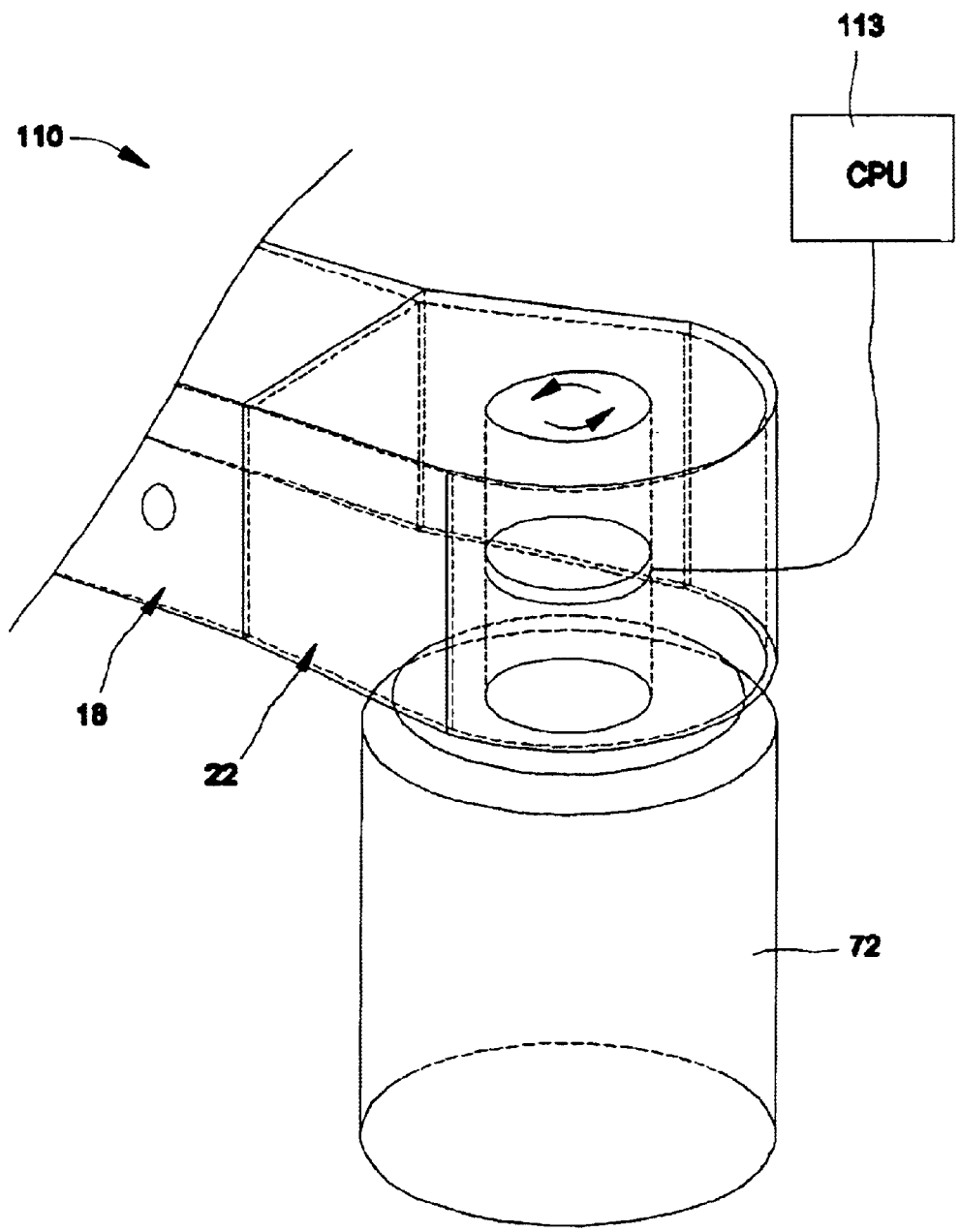
FIG. 24 is a perspective view of a position sensor disposed within a wiper assembly.

In addition, the wiper system 10 may be provided with a position sensor 110 as shown in FIG. 24 to ensure that the housing 18a–f will contact the damper 108 or to ensure that the wiper blade 46 will only be returned to a specific portion of the windshield 106. Specifically, the position sensor 110 will operate to identify the position of the base 22. By feeding this information to the clutch 88, the wiper blade 46 will contact the windshield 106 on return from a lifted or separated position at a specific and predetermined location as the clutch 88 will only disengage the clutch plate 102 when the base 22 is in a predetermined position. In this manner, the windshield 106 may be locally reinforced as the return position of the wiper blade 46 can be controlled.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wiper system for use with a windshield, the wiper system comprising:
   a wiper arm having a first end and a second end, said first end including a reaction surface and a second end including a wiper blade for engagement with the windshield;
   a drive motor attached to said first end of said wiper arm, said drive motor including a drive shaft operable to pivot said wiper arm across the windshield; and
   a separator assembly supported by said drive shaft, said separator assembly disposed within said arm and operable to react against said reaction surface of said arm to selectively lift said wiper arm;
   wherein said separator includes a flexible tension member fixedly attached to said arm at a first end and to a cam at a second end, said cam supported by a cam shaft rotatably received by said drive shaft.

2. The wiper system of claim 1, wherein said arm is pivotably attached to said drive motor.

3. The wiper system of claim 1, wherein said separator includes a clutch, said clutch operable to selectively engage said cam shaft to prevent said cam shaft from rotating relative said drive shaft.

4. The wiper system of claim 3, wherein said flexible tension member engages said reaction surface of said arm to lift said arm from the windshield when said cam shaft is prevented from rotating relative said drive shaft.

5. A wiper system for use with a windshield, the wiper system comprising:
   a wiper arm having a first end and a second end, said first end including a reaction surface and a second end including a wiper blade for engagement with the windshield;
   a drive motor attached to said first end of said wiper arm, said drive motor including a drive shaft operable to pivot said wiper arm across the windshield; and
   a separator assembly supported by said drive motor, said separator assembly including:
      a housing fixedly connected to said arm;
      a shaft rotatably supported by said drive shaft;
      a cam fixedly supported by said cam shaft; and
      a flexible tension member fixedly attached to said cam at a first end and to said arm at a second end, said flexible tension member movable between an engaged position and a disengaged position.

6. The wiper system of claim 5, wherein said flexible tension member is a cable.

7. The wiper system of claim 5, wherein said reaction surface is disposed on a post, said post is fixedly attached to said arm.

8. The wiper system of claim 7, wherein said flexible tension member is operable to engage said post when said cam shaft and said cam are restricted from rotating relative said drive shaft to lift said arm relative said housing.

9. The wiper system of claim 5, wherein said flexible tension member is operable to raise said arm relative said housing when said flexible tension member is subjected to a tensile load.

10. The wiper system of claim 5, wherein said separator further includes a clutch, said clutch operable to selectively engage said shaft to prevent said cam shaft from rotating relative said drive shaft.

11. The wiper system of claim 5, further including a position sensor, said position sensor operable to transmit the position of the arm relative the drive motor.

12. The wiper system of claim 5, further including a shock absorber, said shock absorber operable to dampen rapid movement of said arm and said wiper blade.

* * * * *